US012626937B2

(12) United States Patent
Taruya et al.

(10) Patent No.: US 12,626,937 B2
(45) Date of Patent: May 12, 2026

(54) FUEL CELL POWER SYSTEM

(71) Applicant: HONDA MOTOR CO.,LTD., Tokyo (JP)

(72) Inventors: Kenji Taruya, Saitama (JP); Satoru Kawase, Tokyo (JP); Ryo Jimba, Saitama (JP); Ryota Kitamoto, Saitama (JP); Yoshinaka Hirata, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1115 days.

(21) Appl. No.: 17/679,139

(22) Filed: Feb. 24, 2022

(65) Prior Publication Data

US 2022/0320538 A1 Oct. 6, 2022

(30) Foreign Application Priority Data

Mar. 30, 2021 (JP) ................................. 2021-058419

(51) Int. Cl.
*H01M 8/04082* (2016.01)
*H01M 8/04089* (2016.01)
*H01M 8/04537* (2016.01)

(52) U.S. Cl.
CPC ... *H01M 8/04201* (2013.01); *H01M 8/04089* (2013.01); *H01M 8/04559* (2013.01); *H01M 2250/20* (2013.01)

(58) Field of Classification Search
CPC ......... H01M 8/04201; H01M 8/04313; H01M 8/249; B60L 1/003; B60L 50/70; B60L 58/30
See application file for complete search history.

(56) References Cited

U.S. PATENT DOCUMENTS

| | | | |
|---|---|---|---|
| 2015/0236365 | A1 | 8/2015 | Liu |
| 2017/0250427 | A1 | 8/2017 | Sakai |
| 2019/0237779 | A1 | 8/2019 | Inamoto |
| 2020/0153011 | A1 | 5/2020 | Kumei |
| 2020/0185736 | A1 | 6/2020 | Ito |

FOREIGN PATENT DOCUMENTS

| | | |
|---|---|---|
| CN | 104852066 A | 8/2015 |
| CN | 110085890 A | 8/2019 |
| EP | 3324472 A1 | 5/2018 |
| JP | 2008300140 A | 12/2008 |
| JP | 2012134031 A | 7/2012 |

(Continued)

OTHER PUBLICATIONS

Office Action issued for counterpart Japanese Application No. 2021-058419, issued by the Japanese Patent Office on Nov. 29, 2022 (drafted on Nov. 21, 2022).

(Continued)

*Primary Examiner* — Sarah A. Slifka

(57) ABSTRACT

A fuel cell power system includes a plurality of fuel cell systems that include a fuel cell stack and a fuel tank for storing fuel gas and supplying the fuel gas to the fuel cell stack. The fuel cell power system includes an auxiliary machine that is connected to be electrically switchable to any of the plurality of fuel cell system, and consume electric power output from the plurality of fuel cell systems. The fuel cell power system includes a control device that switches the fuel cell system to which the auxiliary machine is connected, on the basis of the states of the plurality of the fuel cell systems.

18 Claims, 25 Drawing Sheets

(56)          References Cited

FOREIGN PATENT DOCUMENTS

| | | | |
|---|---|---|---|
| JP | 2014026862 | A | 2/2014 |
| JP | 2016091625 | A | 5/2016 |
| JP | 2016119268 | A | 6/2016 |
| JP | 2017152279 | A | 8/2017 |
| JP | 2017201584 | A | 11/2017 |
| JP | 2018129272 | A | 8/2018 |
| JP | 2020077574 | A | 5/2020 |
| JP | 2020092001 | A | 6/2020 |
| WO | 2017010069 | A1 | 1/2017 |

OTHER PUBLICATIONS

Office Action issued for counterpart Japanese Application No. 2021-058419, issued by the Japanese Patent Office on Mar. 28, 2023 (drafted on Mar. 23, 2023).

Office Action issued for counterpart Chinese Application 202210156029. 3, issued by The State Intellectual Property Office of People's Republic of China on Nov. 14, 2024.

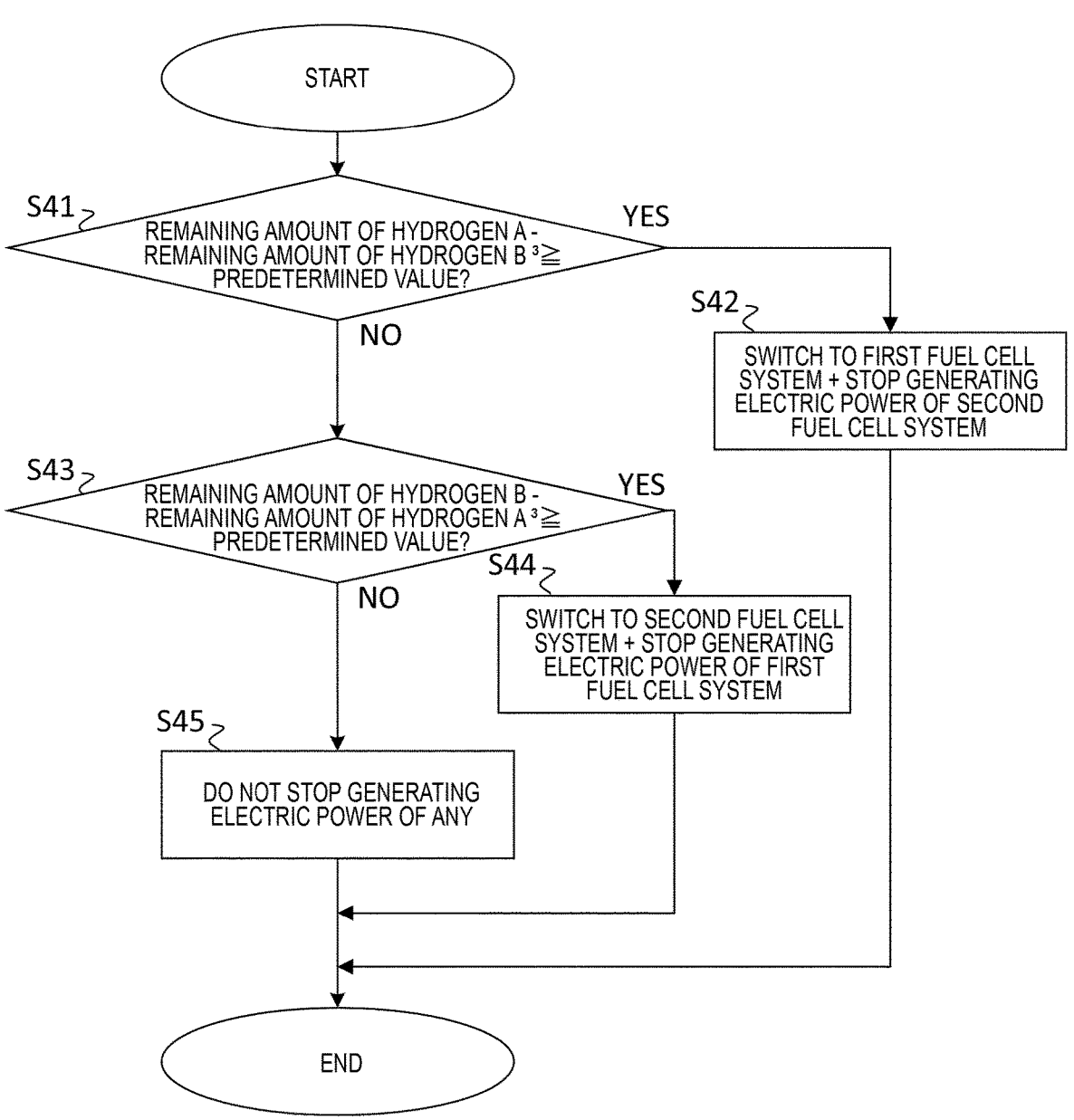

S41 — REMAINING AMOUNT OF HYDROGEN A - REMAINING AMOUNT OF HYDROGEN B ³≧ PREDETERMINED VALUE?

YES

NO

S42 — SWITCH TO FIRST FUEL CELL SYSTEM + STOP GENERATING ELECTRIC POWER OF SECOND FUEL CELL SYSTEM

S43 — REMAINING AMOUNT OF HYDROGEN B - REMAINING AMOUNT OF HYDROGEN A ³≧ PREDETERMINED VALUE?

YES

NO

S44 — SWITCH TO SECOND FUEL CELL SYSTEM + STOP GENERATING ELECTRIC POWER OF FIRST FUEL CELL SYSTEM

S45 — DO NOT STOP GENERATING ELECTRIC POWER OF ANY

START

END

*FIG.11*

FUEL CELL POWER SYSTEM

The contents of the following Japanese patent application (s) are incorporated herein by reference:
2021-058419 filed in JP on Mar. 30, 2021.

BACKGROUND

1. Technical Field

The present invention relates to a fuel cell power system.

2. Related Art

Patent Document 1 describes "a fuel cell system capable of preventing excessive discharge of a battery and preventing unnecessary driving of an air pump when a converter is abnormal".
Patent Document 1: Japanese Patent Application Publication No. 2017-152279

BRIEF DESCRIPTION OF THE DRAWINGS

FIG. 11 is a flowchart illustrating a fifth example of switching the connection of the high voltage auxiliary machine 17 in the first embodiment.

DESCRIPTION OF EXEMPLARY EMBODIMENTS

Hereinafter, the present invention will be described through embodiments of the invention, but the following embodiments do not limit the invention according to the claims. In the following, an example in which a fuel cell power system is mounted on a (electric) vehicle will be described. The vehicle is, for example, a fuel cell vehicle that uses the electric power generated by a fuel cell as the electric power for running or the electric power for operating in-vehicle devices. The vehicle is an example of a moving body, and is an automobile such as a two-wheeled vehicle, a three-wheeled vehicle, or a four-wheeled vehicle. In addition, the vehicle may be, for example, a large vehicle such as a bus or a truck capable of mounting a plurality of fuel cell systems. The fuel cell power system may be mounted on a moving body other than a vehicle (for example, a ship, a flying object, a robot), and may be mounted on a stationary fuel cell system. In addition, not all combinations of features described in the embodiments are essential to the solution of the invention.

Figure 1:
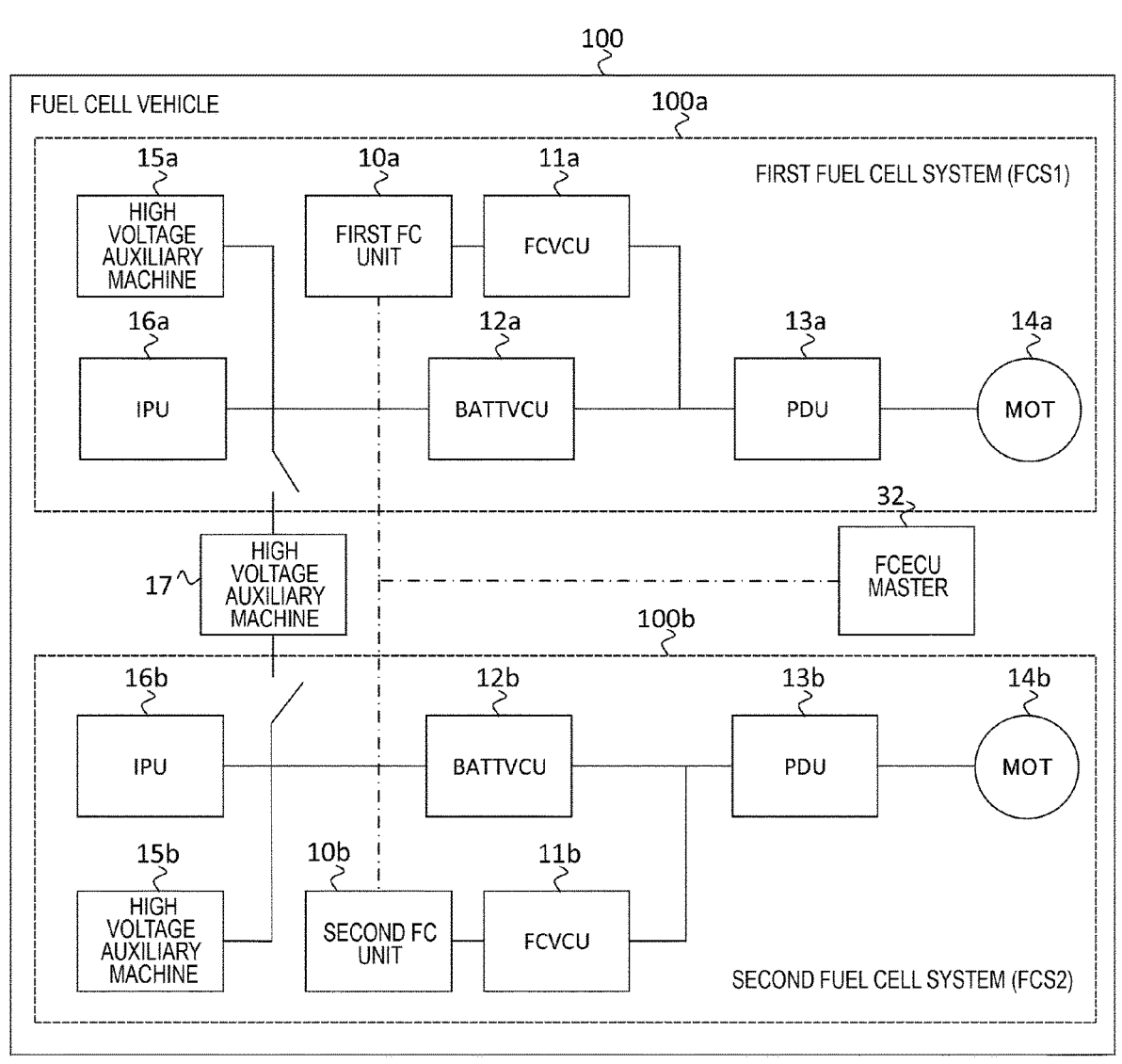
FIG. 1 is a diagram illustrating a schematic configuration of a vehicle 100 according to a first embodiment.

FIG. 1 is a diagram illustrating a schematic configuration of a vehicle 100 according to a first embodiment. As illustrated in FIG. 1, the vehicle 100 includes a first fuel cell system 100a, a second fuel cell system 100b, and a high voltage auxiliary machine 17. The vehicle 100 is, for example, a large vehicle such as a large truck and is driven by a plurality of fuel cell systems. A large vehicle such as a large truck is smoothly driven due to having the driving force of the plurality of fuel cell systems. Note that the vehicle 100 may be a small vehicle.

The first fuel cell system (also referred to as FCS1) 100a includes a first FC (Fuel Cell) unit 10a, an FCVCU (Fuel Cell Voltage Control Unit) 11a, a BATTVCU (BATTERY Voltage Control Unit) 12a, and a PDU (Power Drive Unit) 13a, a MOT (MOTOR) 14a, a high voltage auxiliary machine 15a, and an IPU (Intelligent Power Unit) 16a.

The second fuel cell system (also referred to as FCS2) 100b includes a second FC unit 10b, an FCVCU 11b, a BATTVCU 12b, a PDU 13b, a MOT 14b, a high voltage auxiliary machine 15b, and an IPU 16b. The first FC unit 10a of the first fuel cell system 100a and the second FC unit 10b of the second fuel cell system 100b are connected to an FCECU master 32 as a control device.

Figure 2:
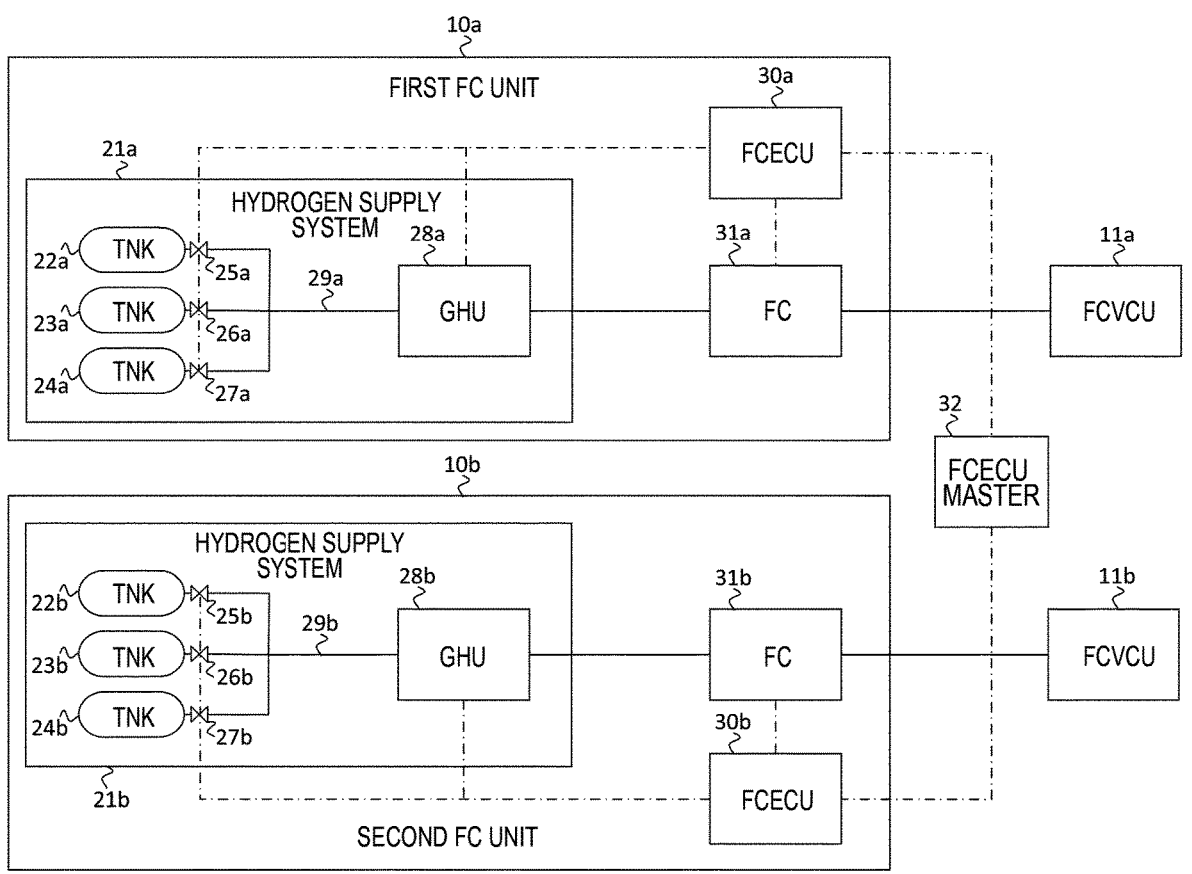
FIG. 2 is a diagram illustrating a schematic configuration of a first FC unit 10a and a second FC unit 10b in the first embodiment.

FIG. 2 is a diagram illustrating a schematic configuration of the first FC unit 10a and the second FC unit 10b in the first embodiment. As illustrated in FIG. 2, the first FC unit 10a has a hydrogen supply system 21a, an FCECU (Fuel Cell Electronic Control Unit) 30a, and an FC (Fuel Cell) 31a.

The hydrogen supply system 21a includes a plurality of (for example, three) hydrogen tanks 22a, 23a, and 24a for storing hydrogen gas, and a pressure reduction valve unit 28a. The pressure reduction valve unit 28a is a high pressure unit that controls the filling of hydrogen gas into the hydrogen tanks 22a, 23a, and 24a and the discharging of hydrogen gas from the hydrogen tanks 22a, 23a, and 24a. The hydrogen tanks 22a, 23a, and 24a and the pressure reduction valve unit 28a are connected by a pipe 29a.

The hydrogen supply system 21a includes a temperature sensor (not illustrated) that detects the temperature in each of the hydrogen tanks 22a, 23a, and 24a, and pressure sensors (not illustrated) that detect the pressures in the hydrogen tanks 22a, 23a, and 24a. In the present embodiment, the average value of the remaining amount of hydrogen in the hydrogen tanks 22a, 23a, and 24a detected by the pressure sensor is defined as a remaining amount of hydrogen A. In another example, the total value or the minimum value of the remaining amounts of hydrogen in the hydrogen tanks 22a, 23a, and 24a may be defined as the remaining amount of hydrogen A.

The hydrogen tanks 22a, 23a, and 24a are provided with valves 25a, 26a, and 27a, respectively. For example, in a case where the vehicle 100 is running, the valves 25a, 26a, and 27a are opened at the same time in order to supply the hydrogen gas stored in the hydrogen tanks 22a, 23a, and 24a to the FC 31a via the pressure reduction valve unit 28a. In addition, these valves 25a, 26a, and 27a can each be independently opened and closed manually by an operator in consideration of the maintenance of the vehicle 100.

The FCECU 30a is a computer including a microcomputer, and includes an input/output device such as an A/D converter and a D/A converter, and a timer as a time measuring unit in addition to a CPU, a ROM, and a RAM. In the FCECU 30a, the CPU reads and executes a program recorded in the ROM.

The FCECU 30a is configured to perform energy management for the first FC unit 10a. The FCECU 30a functions as, for example, a flow rate/pressure calculation unit, a rotation speed calculation unit, a power estimation unit, a pump power calculation unit, a gas control unit, and a power system control unit by reading and executing the program recorded in the ROM by the CPU.

The FCECU 30a is communicatively connected to the hydrogen supply system 21a, the pressure reduction valve unit 28a, and the FC 31a via a signal line. In FIG. 2, the signal line is illustrated as a dashed line. The FCECU 30a executes a program stored in the ROM and detects, for example, sensor detection values of an opening sensor, a pressure sensor, a flow rate sensor, a temperature sensor, a rotation speed sensor of an air pump (not illustrated), and the like, the voltage and the current of the FC 31a, the voltage, the current, and the rotation speed of the air pump, the voltage, the current, and the rotation speed of the motor, etc. so as to control each device.

The FC 31a is a fuel cell stack, and has a structure in which fuel cells formed by sandwiching a solid polymer electrolyte membrane between an anode electrode and a cathode electrode are laminated. Hydrogen gas as fuel gas is supplied to the anode electrode side via an anode flow path, and air as oxidant gas is supplied to the cathode electrode side via a cathode flow path. Hydrogen gas reacts with oxygen in the air to generate water and generates electric power.

The FC 31a is connected to a motor 14a via the FCVCU 11a which is a boost converter and the PDU 13a which is an inverter.

The second FC unit 10b includes a hydrogen supply system 21b, an FCECU 30b, and an FC 31b. The hydrogen supply system 21b includes a plurality of (for example, three) hydrogen tanks 22b, 23b, and 24b for storing hydrogen gas, and a pressure reduction valve unit 28b. The hydrogen tanks 22b, 23b, and 24b are provided with valves 25b, 26b, and 27b, respectively. In the present embodiment, the average value of the remaining amount of hydrogen in the hydrogen tanks 22b, 23b, and 24b detected by the pressure sensor is defined as a remaining amount of hydrogen B. In another example, the configuration of the other second FC unit 10b in which the total value or the minimum value of the remaining amount of hydrogen in the hydrogen tanks 22b, 23b, and 24b may be defined as the remaining amount of hydrogen B is the same as the configuration of the first FC unit 10a, and thus the detailed description will be omitted.

The FCECU 30a of the first FC unit 10a and the FCECU 30b of the second FC unit 10b are connected to the FCECU master 32 as a control device by a signal line. The FCECU master 32 collectively manages the FCECU 30a of the first FC unit 10a and the FCECU 30b of the second FC unit 10b.

Returning to FIG. 1, the FCVCU 11a is a voltage regulator provided with a chopper circuit, and boosts the voltage on the primary side according to a control signal of the FCECU 30a and applies the boosted voltage to the secondary side. Similarly, the FCVCU 11b is a voltage regulator provided with a chopper circuit, and boosts the voltage on the primary side according to a control signal of the FCECU 30b and applies the boosted voltage to the secondary side.

The PDU 13a has a three-phase bridge type configuration, converts the DC voltage on the secondary side into an AC voltage, and controls the MOT 14a according to the control signal of the target rotation speed output from the FCECU 30a. Note that, at the time of regeneration, the PDU 13a functions as a converter and converts the AC voltage generated by the MOT 14a into a DC voltage. Similarly, the PDU 13b has a three-phase bridge type configuration, converts the DC voltage on the secondary side into an AC voltage, and controls the MOT 14b according to the control signal of the target rotation speed output from the FCECU 30b. Note that, at the time of regeneration, the PDU 13b functions as a converter and converts the AC voltage generated by the MOT 14b into a DC voltage.

The BATTVCU 12a is a voltage regulator provided with a chopper circuit, boosts the voltage on the primary side and applies the boosted voltage to the secondary side at the time of power running, and steps down the voltage on the secondary side and applies the stepped-down voltage to the primary side at the time of regeneration, according to the control signal output from the FCECU 30a. The FCVCU 11a and the BATTVCU 12a are connected in parallel to the MOT 14a on the secondary side. Various high voltage auxiliary machines 15a and 17 are connected in parallel on the primary side of the BATTVCU 12a.

Similarly, the BATTVCU 12b is a voltage regulator provided with a chopper circuit, boosts the voltage on the primary side and applies the boosted voltage to the secondary side at the time of power running, and steps down the voltage on the secondary side and applies the stepped-down voltage to the primary side at the time of regeneration, according to the control signal output from the FCECU 30b. The FCVCU 11b and the BATTVCU 12b are connected in parallel to the MOT 14b on the secondary side. Various high voltage auxiliary machine 15b and 17 are connected in parallel on the primary side of the BATTVCU 12b.

The high voltage auxiliary machine 15a includes an air pump in the first FC unit 10a. The high voltage auxiliary machine 15b includes an air pump in the second FC unit 10b. The high voltage auxiliary machine 17 includes a high voltage auxiliary machine that may belong to either the first fuel cell system 100a or the second fuel cell system 100b. The high voltage auxiliary machine 17 includes, for example, a 12V power source, a 24V power source, a DC/DC converter, an A/C converter, a luggage compartment refrigerator, a power steering (also referred to as a power steering), and an air conditioner (also referred to as an air conditioner), and a water pump.

The high voltage auxiliary machines 15a, 15b, and 17 are electric machines installed in the vehicle 100 including a fuel cell power system. The high voltage auxiliary machines 15a, 15b, and 17 may be electric machines used for running, stopping, or steering the vehicle 100, or may be electric machines not used for running, stopping, or steering the vehicle 100. The high voltage auxiliary machines 15a, 15b, 17 may be electric machines that are not currently in operation. The power sources of the high voltage auxiliary machines 15a, 15b, and 17 may be turned on or off by a user. The FCECU master 32 may hold in advance a table of the high voltage auxiliary machines 15a, 15b, and 17 in which information related to the high voltage auxiliary machines 15a, 15b, and 17 is stored. The table may list the power consumption of each of the high voltage auxiliary machines 17.

The high voltage auxiliary machine 17 is connected to be electrically switchable to the fuel cell system of either the first fuel cell system 100a or the second fuel cell system 100b. The high voltage auxiliary machine 17 is connected to the first fuel cell system 100a by a switch 171 and to the second fuel cell system 100b by a switch 172. The high voltage auxiliary machine 17 consumes the electric power output from the fuel cell system of either the first fuel cell system 100a or the second fuel cell system 100b. The FCECU master 32 as a control device switches the connection destination of the high voltage auxiliary machine 17 on the basis of the state of the first fuel cell system 100a and the second fuel cell system 100b. In the first embodiment, the state of the first fuel cell system 100a and the second fuel cell system 100b includes a difference between the remaining amount of hydrogen A, which is the average of the remaining amount of hydrogen of the first fuel cell system 100a, and the remaining amount of hydrogen B, which is the average of the remaining amount of hydrogen of the second fuel cell system 100b.

The IPUs 16a and 16b are intelligent power units. The IPU 16a is connected to the MOT 14a via a battery contactor (not illustrated) and the BATTVCU 12a which is a buck-boost converter. The IPU 16b is connected to the MOT 14b via a battery contactor (not illustrated) and the BATTVCU 12b which is a buck-boost converter. The IPUs 16a and 16b consist of a battery, a DC-DC converter, an ECU for battery control, and the like.

Figure 3:
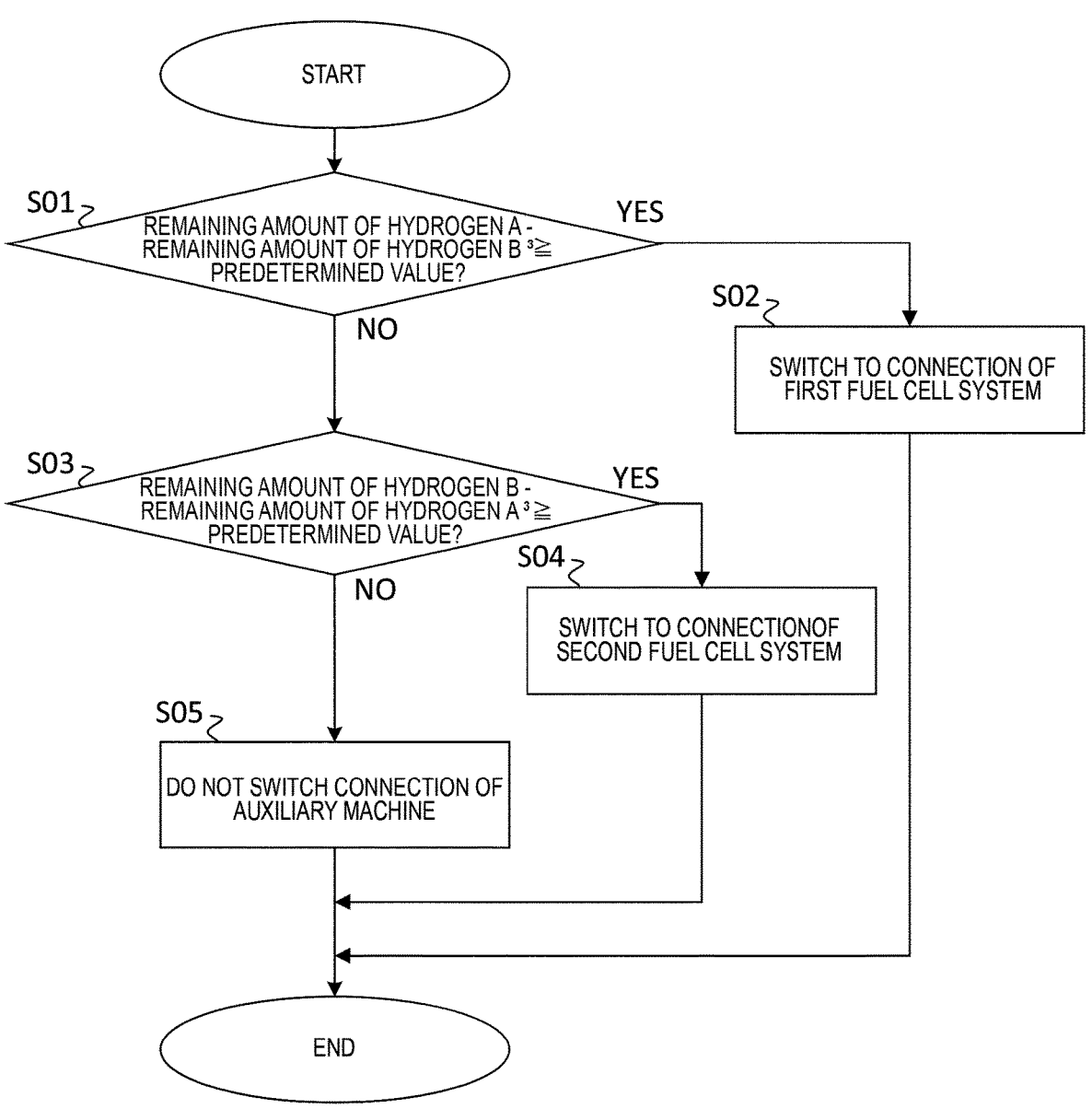
FIG. 3 is a flowchart illustrating a first example of switching the connection of a high voltage auxiliary machine 17 in the first embodiment.
Figure 4A:
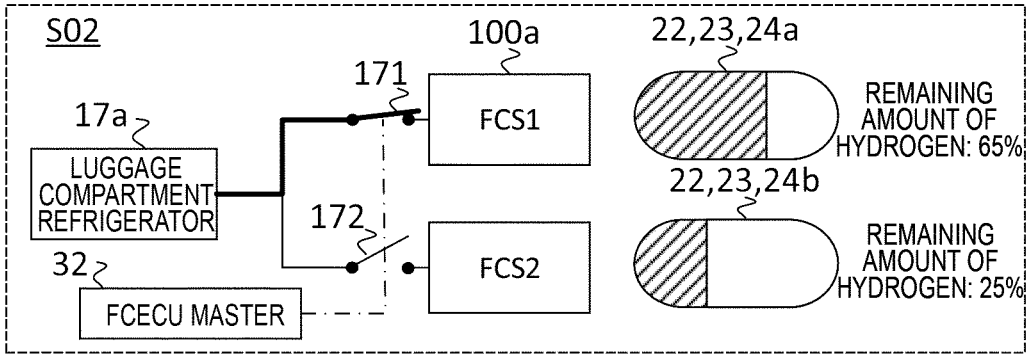
FIG. 4A is an image diagram of a connection state of the high voltage auxiliary machine 17 in the first example.
Figure 4B:
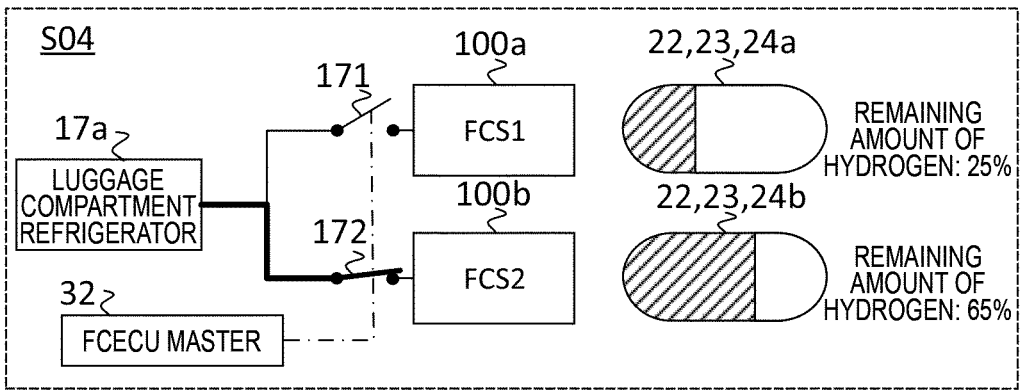
FIG. 4B is an image diagram of a connection state of the high voltage auxiliary machine 17 in the first example.

FIG. 3 is a diagram illustrating a first example of switching the connection of the high voltage auxiliary machine 17 in the first embodiment. FIG. 3 illustrates a flowchart of switching the connection of the high voltage auxiliary machine 17 in the first example. FIG. 4A and FIG. 4B are image diagrams of the connection state of the high voltage auxiliary machine 17 in the first example. The image diagram illustrated in FIG. 4A illustrates an image diagram of the connection state at the stage of S02 in the flowchart, and the image diagram illustrated in FIG. 4B illustrates an image diagram of the connection state at the stage of S04 in the flowchart.

As illustrated in the image diagrams of the connection state of the high voltage auxiliary machine 17 of FIG. 4A and FIG. 4B, in the first example, a luggage compartment refrigerator 17a, which is the high voltage auxiliary machine 17, can be connected to either the first fuel cell system 100a and the second fuel cell system 100b. Note that, in the image diagrams illustrated in FIG. 4A and FIG. 4B, for convenience, the hydrogen tanks in the first fuel cell system 100a and the second fuel cell system 100b are drawn outside the first fuel cell system 100a and the second fuel cell system 100b.

In the flowchart of FIG. 3, in a case where a value obtained by subtracting the remaining amount of hydrogen B, which is the average of the remaining amount of hydrogen of the second fuel cell system 100b, from the remaining amount of hydrogen A, which is the average of the remaining amount of hydrogen of the first fuel cell system 100a, is equal to or greater than a predetermined value (S01: YES), and where the luggage compartment refrigerator 17a is connected to the second fuel cell system 100b, the connection destination of the luggage compartment refrigerator 17a is switched to the connection of the first fuel cell system 100a (S02). In the example illustrated in the image diagram of FIG. 4A, the remaining amount of hydrogen A is 65%, the remaining amount of hydrogen B is 25%, and the remaining amount of hydrogen A–the remaining amount of hydrogen B=40%. Note that, in a case where the luggage compartment refrigerator 17a is originally connected to the first fuel cell system 100a, the switching of the connection destination of the luggage compartment refrigerator 17a is not performed.

In a case where the value obtained by subtracting the remaining amount of hydrogen B, which is the average of the remaining amount of hydrogen of the second fuel cell system 100b, from the remaining amount of hydrogen A, which is the average of the remaining amount of hydrogen of the first fuel cell system 100a, is not equal to or greater than the predetermined value (S01: NO), where a value obtained by subtracting the remaining amount of hydrogen A, which is the average of the remaining amount of hydrogen of the first fuel cell system 100a, from the remaining amount of hydrogen B, which is the average of the remaining amount of hydrogen of the second fuel cell system 100b, is equal to or greater than a predetermined value (S03: YES), and where the luggage compartment refrigerator 17a is connected to the first fuel cell system 100a, the connection destination of the luggage compartment refrigerator 17a is switched to the connection of the second fuel cell system 100b (S04). In the example illustrated in the image diagram of FIG. 4B, the remaining amount of hydrogen B is 65%, the remaining amount of hydrogen A is 25%, and the remaining amount of hydrogen B–the remaining amount of hydrogen A=40%. Note that, in a case where the luggage compartment refrigerator 17a is originally connected to the second fuel cell system 100b, the switching of the connection destination of the luggage compartment refrigerator 17a is not performed.

In a case where the value obtained by subtracting the remaining amount of hydrogen A, which is the average of the remaining amount of hydrogen of the first fuel cell system 100a, from the remaining amount of hydrogen B, which is the average of the remaining amount of hydrogen of the second fuel cell system 100b, is not equal to or greater than the predetermined value (S03: NO), the connection destination of the luggage compartment refrigerator 17a is not switched (S05).

Figure 5:
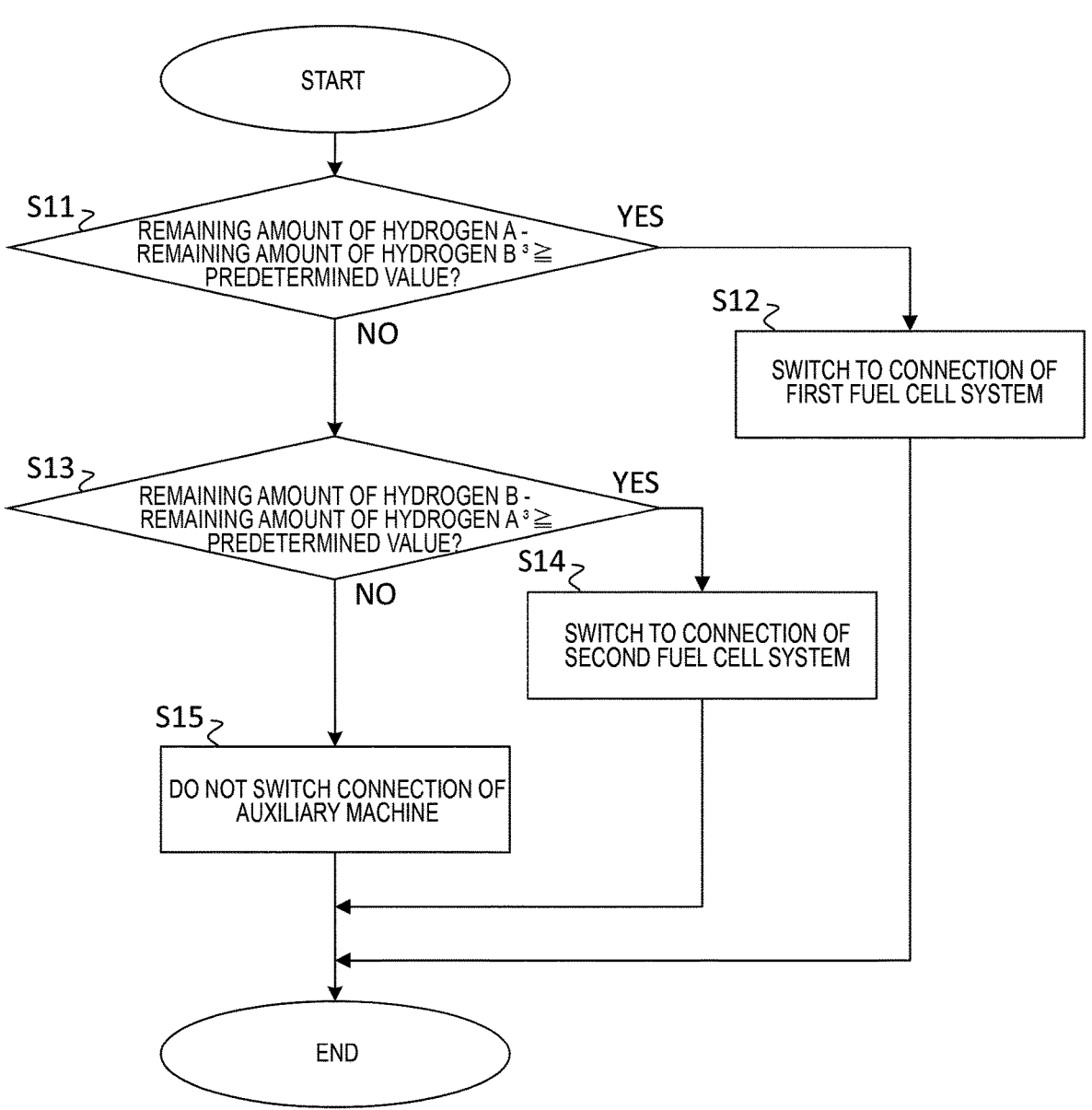
FIG. 5 is a flowchart illustrating a second example of switching the connection of the high voltage auxiliary machine 17 in the first embodiment.
Figure 6A:
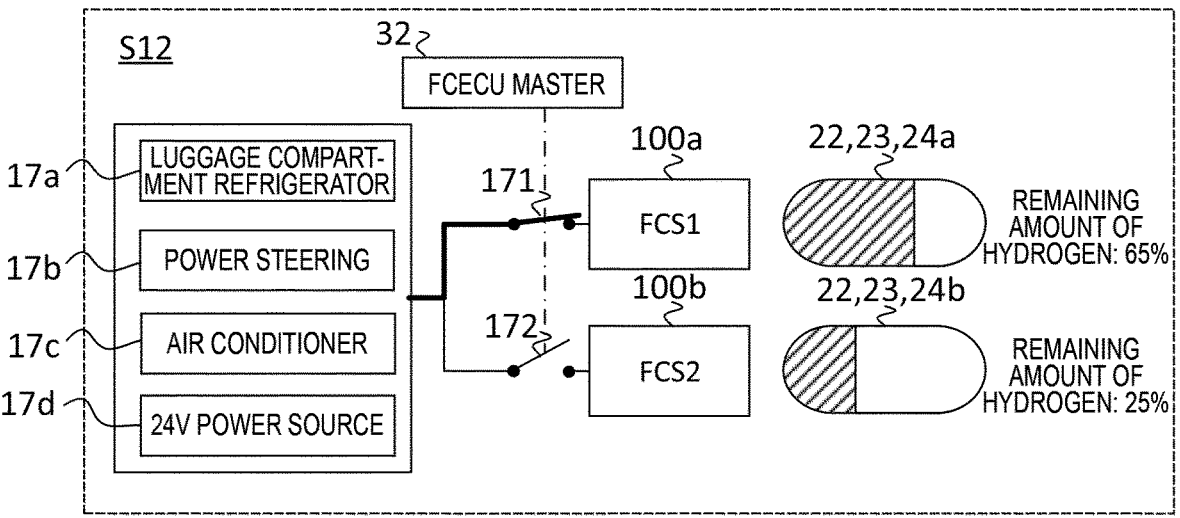
FIG. 6A is an image diagram of a connection state of the high voltage auxiliary machine 17 in the second example.
Figure 6B:
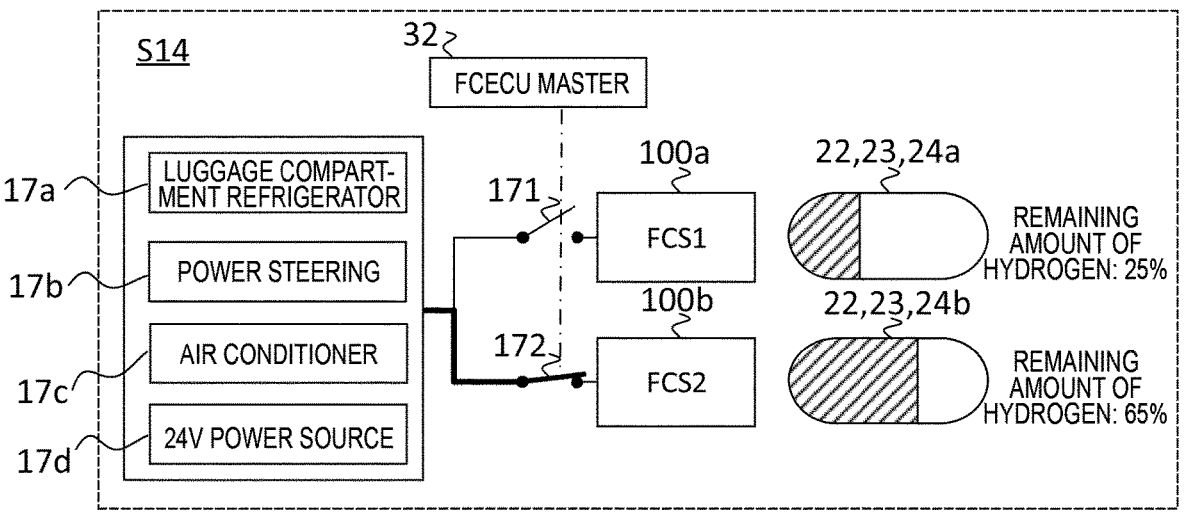
FIG. 6B is an image diagram of a connection state of the high voltage auxiliary machine 17 in the second example.

FIG. 5 is a diagram illustrating a second example of switching the connection of the high voltage auxiliary machine 17 in the first embodiment. FIG. 5 illustrates a flowchart of switching the connection of the high voltage auxiliary machine 17 in the second example. FIG. 6A and FIG. 6B are image diagrams of the connection state of the high voltage auxiliary machine 17 in the second example. The image diagram illustrated in FIG. 6A illustrates an image diagram of the connection state at the stage of S12 in the flowchart, and the image diagram illustrated in FIG. 6B illustrates an image diagram of the connection state at the stage of S14 in the flowchart.

As illustrated in the image diagrams of the connection state of the high voltage auxiliary machine 17 in FIG. 6A and FIG. 6B, in the second example, the luggage compartment refrigerator 17a, a power steering 17b, an air conditioner 17c, and a 24V power source 17d, each of which is the high voltage auxiliary machine 17, can be collectively connected to either the first fuel cell system 100a or the second fuel cell system 100b.

In the flowchart of FIG. 5, in a case where the value obtained by subtracting the remaining amount of hydrogen B, which is the average of the remaining amount of hydrogen of the second fuel cell system 100b, from the remaining amount of hydrogen A, which is the average of the remaining amount of hydrogen of the first fuel cell system 100a, is equal to or greater than a predetermined value (S11: YES), the connection destinations of the luggage compartment refrigerator 17a, the power steering 17b, the air conditioner 17c, and the 24V power source 17d are collectively switched to the connection of the first fuel cell system 100a (S12). In the example illustrated in the image diagram of FIG. 6A, the remaining amount of hydrogen A is 65%, the remaining amount of hydrogen B is 25%, and the remaining amount of hydrogen A–the remaining amount of hydrogen B=40%.

In a case where the value obtained by subtracting the remaining amount of hydrogen B, which is the average of the remaining amount of hydrogen of the second fuel cell system 100b, from the remaining amount of hydrogen A, which is the average of the remaining amount of hydrogen of the first fuel cell system 100a is not equal to or greater than the predetermined value (S11: NO), and where the value obtained by subtracting the remaining amount of hydrogen A, which is the average of the remaining amount of hydrogen of the first fuel cell system 100a, from the remaining amount of hydrogen B, which is the average of the remaining amount of hydrogen of the second fuel cell system 100b, is equal to or greater than a predetermined value (S13: YES), the connection destinations of the luggage compartment refrigerator 17a, the power steering 17b, the air conditioner 17c, and the 24V power source 17d are collectively switched to the connection of the second fuel cell system 100b (S14). In the example illustrated in the image diagram of FIG. 6B, the remaining amount of hydrogen B is 65%, the remaining amount of hydrogen A is 25%, and the remaining amount of hydrogen B–the remaining amount of hydrogen A=40%.

In a case where the value obtained by subtracting the remaining amount of hydrogen A, which is the average of the remaining amount of hydrogen of the first fuel cell system 100a, from the remaining amount of hydrogen B, which is the average of the remaining amount of hydrogen of the second fuel cell system 100b, is not equal to or greater than the predetermined value (S13: NO), the connection destinations of the luggage compartment refrigerator 17a, the power steering 17b, the air conditioner 17c, and the 24V power source 17d are not switched (S15).

Figure 7:
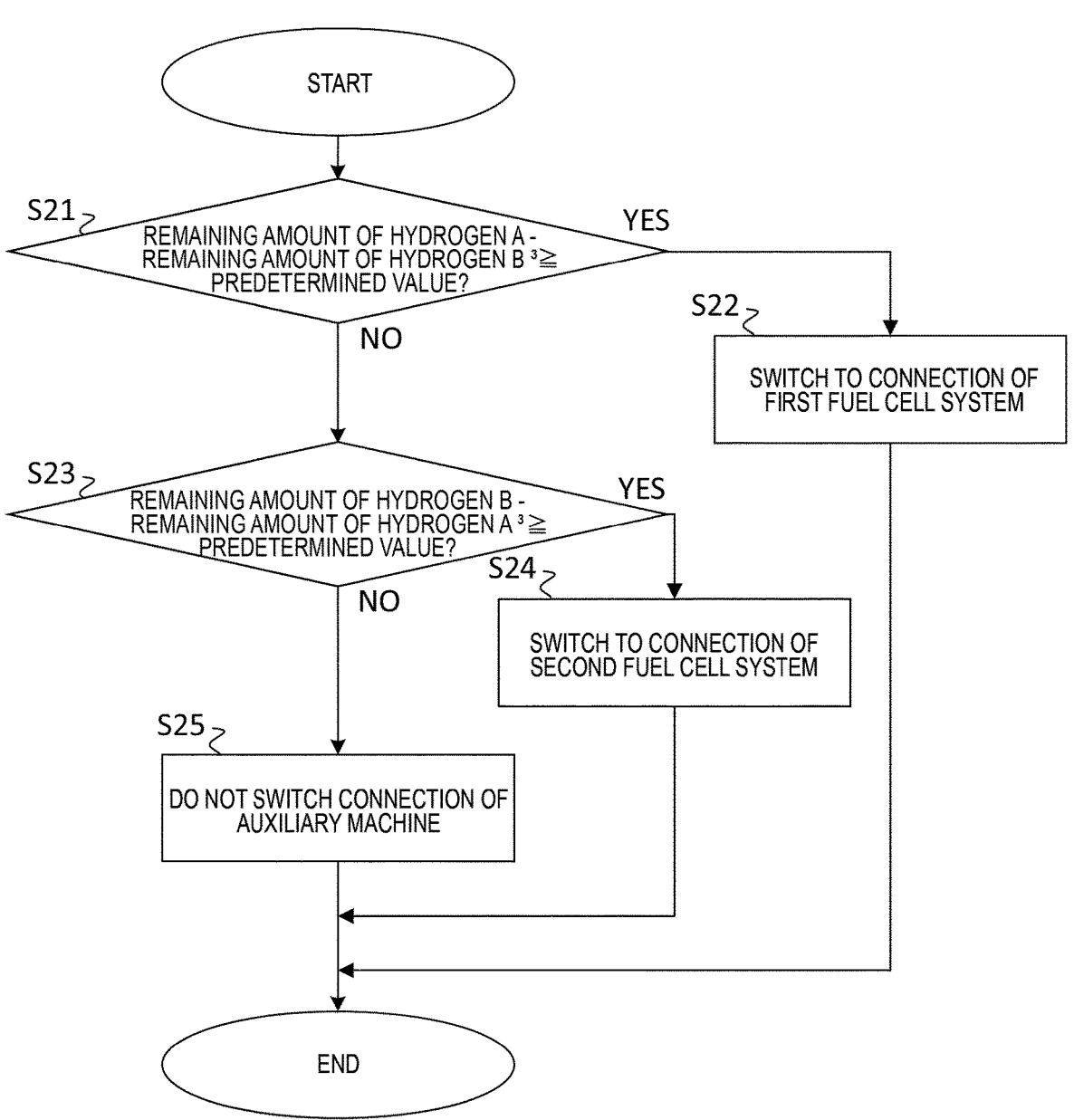
FIG. 7 is a flowchart illustrating a third example of switching the connection of the high voltage auxiliary machine 17 in the first embodiment.
Figure 8A:
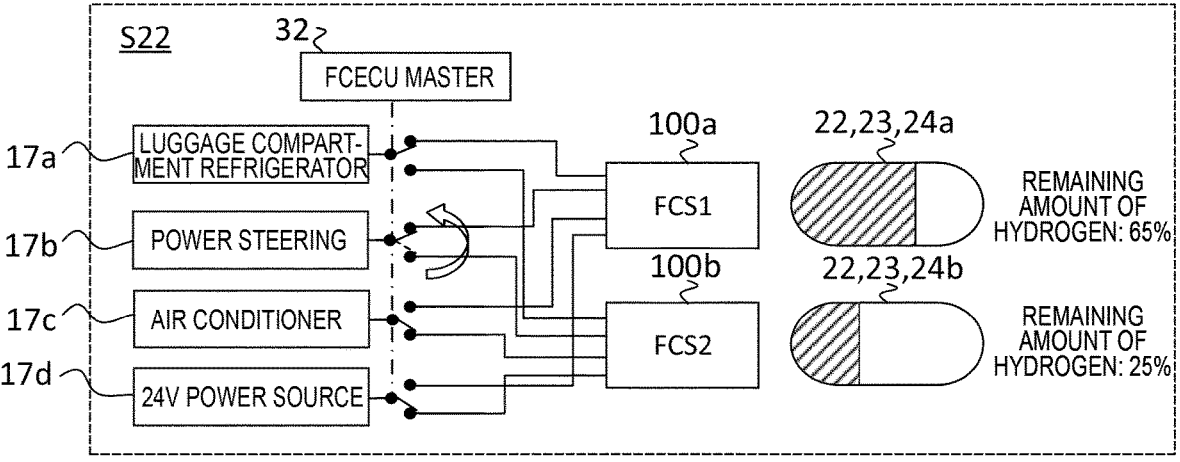
FIG. 8A is an image diagram of a connection state of the high voltage auxiliary machine 17 in the third example.
Figure 8B:
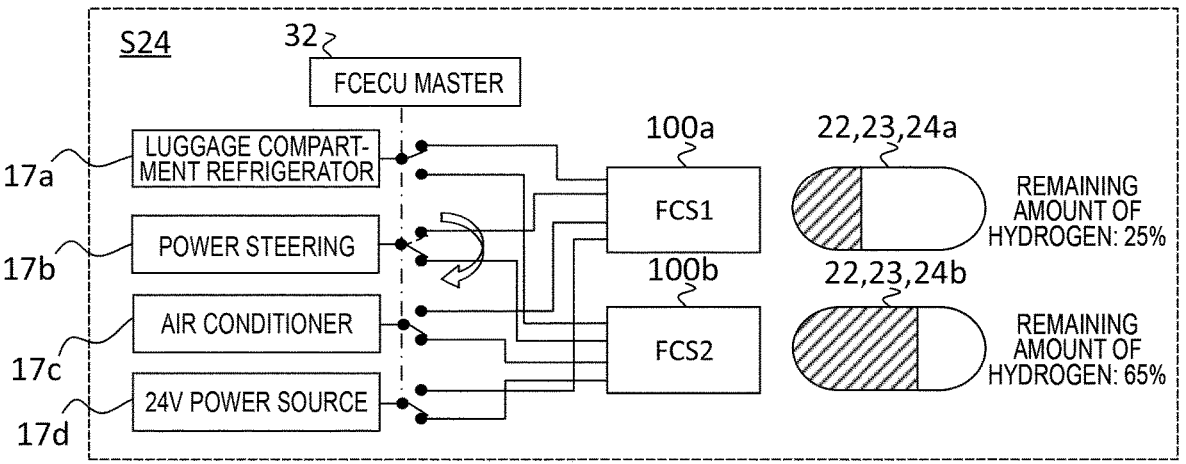
FIG. 8B is an image diagram of a connection state of the high voltage auxiliary machine 17 in the third example.

FIG. 7 is a diagram illustrating a third example of switching the connection of the high voltage auxiliary machine 17 in the first embodiment. FIG. 7 illustrates a flowchart of switching the connection of the high voltage auxiliary machine 17 in the third example. FIG. 8A and FIG. 8B are image diagrams of the connection state of the high voltage auxiliary machine 17 in the third example. The image diagram illustrated in FIG. 8A illustrates an image diagram of the connection state at the stage of S22 in the flowchart, and the image diagram illustrated in FIG. 8B illustrates an image diagram of the connection state at the stage of S24 in the flowchart.

As illustrated in the image diagrams of the connection state of the high voltage auxiliary machine 17 in FIG. 8A and FIG. 8B, in the third example, the luggage compartment refrigerator 17a, the power steering 17b, the air conditioner 17c, and the 24V power source 17d, each of which is the high voltage auxiliary machine 17, each can be individually connected to either the first fuel cell system 100a or the second fuel cell system 100b.

In the flowchart of FIG. 7, in a case where the value obtained by subtracting the remaining amount of hydrogen B, which is the average of the remaining amount of hydrogen of the second fuel cell system 100b, from the remaining amount of hydrogen A, which is the average of the remaining amount of hydrogen of the first fuel cell system 100a, is equal to or greater than a predetermined value (S21: YES), the connection destination of the power steering 17b is switched to the connection of the first fuel cell system 100a (S22). In the example illustrated in the image diagram of FIG. 8A, the remaining amount of hydrogen A is 65%, the remaining amount of hydrogen B is 25%, and the remaining amount of hydrogen A–the remaining amount of hydrogen B=40%. Note that the switching of the connection destinations of the luggage compartment refrigerator 17a, the air conditioner 17c, and the 24V power source 17d is not performed.

In a case where the value obtained by subtracting the remaining amount of hydrogen B, which is the average of the remaining amount of hydrogen of the second fuel cell system 100b, from the remaining amount of hydrogen A, which is the average of the remaining amount of hydrogen of the first fuel cell system 100a is not equal to or greater than the predetermined value (S21: NO), and where the value obtained by subtracting the remaining amount of hydrogen A, which is the average of the remaining amount of hydrogen of the first fuel cell system 100a, from the remaining amount of hydrogen B, which is the average of the remaining amount of hydrogen of the second fuel cell system 100b, is equal to or greater than a predetermined value (S23: YES), the connection destination of the power steering 17b is switched to the connection of the second fuel cell system 100b (S24). In the example illustrated in the image diagram of FIG. 8B, the remaining amount of hydrogen B is 65%, the remaining amount of hydrogen A is 25%, and the remaining amount of hydrogen B–the remaining amount of hydrogen A=40%. Note that the switching of the connection destinations of the luggage compartment refrigerator 17a, the air conditioner 17c, and the 24V power source 17d is not performed.

In a case where the value obtained by subtracting the remaining amount of hydrogen A, which is the average of the remaining amount of hydrogen of the first fuel cell system 100a, from the remaining amount of hydrogen B, which is the average of the remaining amount of hydrogen of the second fuel cell system 100b, is not equal to or greater than the predetermined value (S23: NO), the connection destination of the high voltage auxiliary machine 17 is not switched (S25).

Figure 9:
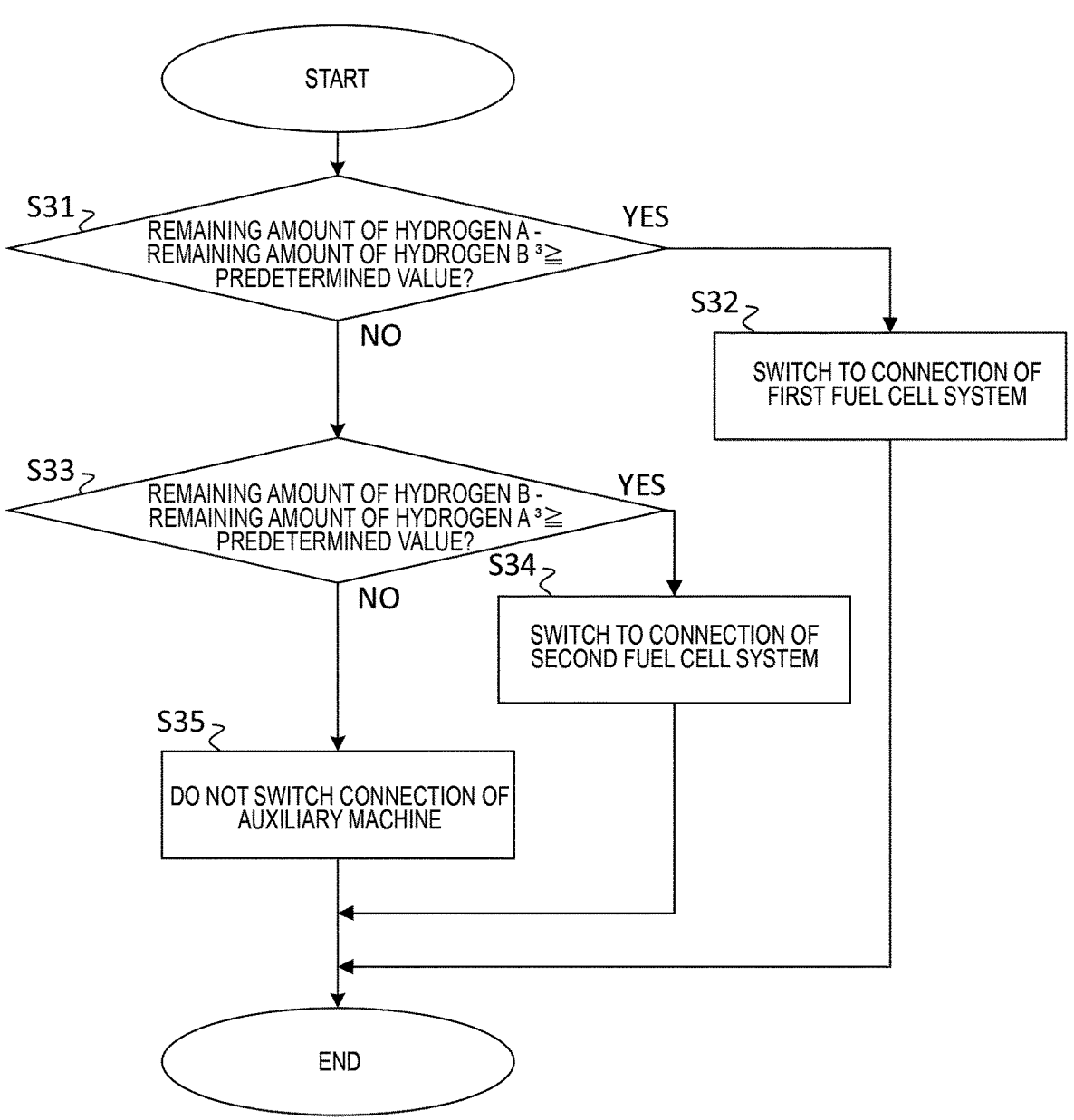
FIG. 9 is a flowchart illustrating a fourth example of switching the connection of the high voltage auxiliary machine 17 in the first embodiment.
Figure 10A:
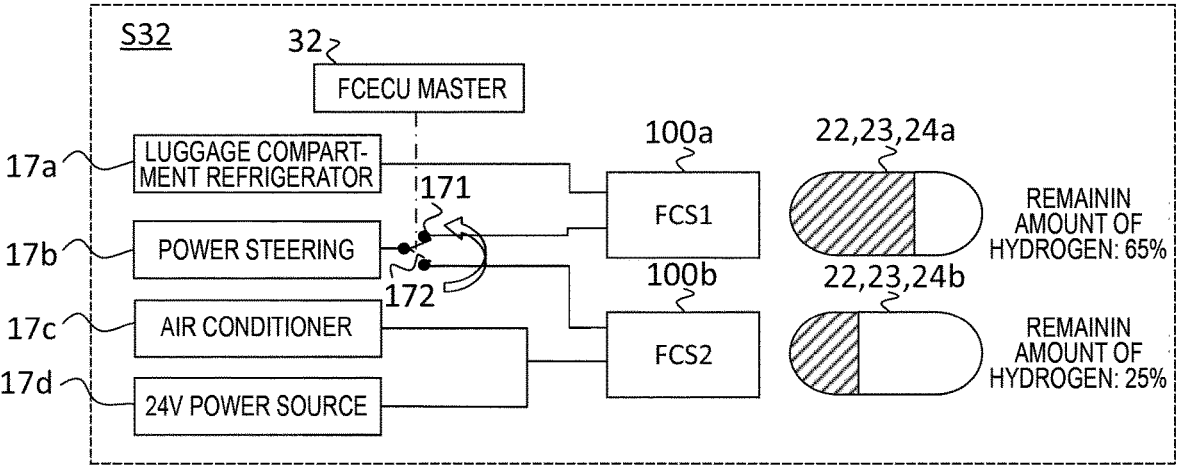
FIG. 10A is an image diagram of a connection state of the high voltage auxiliary machine 17 in the fourth example.
Figure 10B:
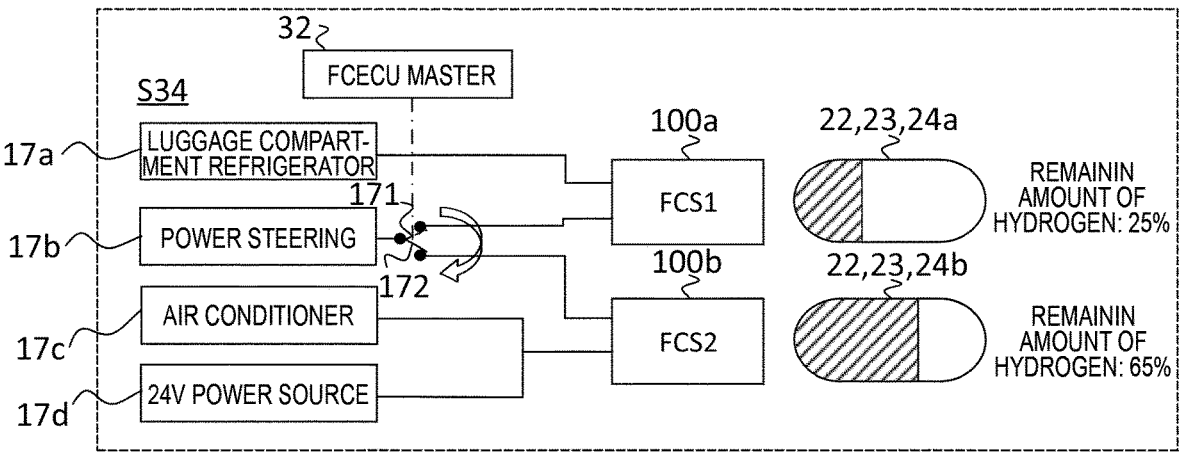
FIG. 10B is an image diagram of a connection state of the high voltage auxiliary machine 17 in the fourth example.

FIG. 9 is a diagram illustrating a fourth example of switching the connection of the high voltage auxiliary machine 17 in the first embodiment. FIG. 9 illustrates a flowchart of switching the connection of the high voltage auxiliary machine 17 in the fourth example. FIG. 10A and FIG. 10B are image diagrams of the connection state of the high voltage auxiliary machine 17 in the fourth example. The image diagram illustrated in FIG. 10A illustrates an image diagram of the connection state at the stage of S32 in the flowchart, and the image diagram illustrated in FIG. 10B illustrates an image diagram of the connection state at the stage of S34 in the flowchart.

As illustrated in the image diagram of the connection state of the high voltage auxiliary machine 17 in FIG. 10A and FIG. 10B, in the fourth example, the luggage compartment refrigerator 17a, which is the high voltage auxiliary machine 17, is connected to the first fuel cell system 100a, the air conditioner 17c and the 24V power source 17d are connected to the second fuel cell system 100b, and the power steering 17b is connected to be electrically switchable to either the first fuel cell system 100a or the second fuel cell system 100b.

In the flowchart of FIG. 9, in a case where the value obtained by subtracting the remaining amount of hydrogen B, which is the average of the remaining amount of hydrogen of the second fuel cell system 100b, from the remaining amount of hydrogen A, which is the average of the remaining amount of hydrogen of the first fuel cell system 100a, is equal to or greater than a predetermined value (S31: YES), the connection destination of the power steering 17b is switched to the connection of the first fuel cell system 100a (S32). In the example illustrated in the image diagram of FIG. 10A, the remaining amount of hydrogen A is 65%, the remaining amount of hydrogen B is 25%, and the remaining amount of hydrogen A–the remaining amount of hydrogen B=40%. Note that the switching of the connection destinations of the luggage compartment refrigerator 17a, the air conditioner 17c, and the 24V power source 17d is not performed.

In a case where the value obtained by subtracting the remaining amount of hydrogen B, which is the average of the remaining amount of hydrogen of the second fuel cell system 100b, from the remaining amount of hydrogen A, which is the average of the remaining amount of hydrogen of the first fuel cell system 100a is not equal to or greater than the predetermined value (S31: NO), and where the value obtained by subtracting the remaining amount of hydrogen A, which is the average of the remaining amount of hydrogen of the first fuel cell system 100a, from the remaining amount of hydrogen B, which is the average of the remaining amount of hydrogen of the second fuel cell system 100b, is equal to or greater than a predetermined value (S33: YES), the connection destination of the power steering 17b is switched to the connection of the second fuel cell system 100b (S34). In the example illustrated in the image diagram of FIG. 10B, the remaining amount of hydrogen B is 65%, the remaining amount of hydrogen A is 25%, and the remaining amount of hydrogen B–the remaining amount of hydrogen A=40%. Note that the switching of the connection destinations of the luggage compartment refrigerator 17a, the air conditioner 17c, and the 24V power source 17d is not performed.

In a case where the value obtained by subtracting the remaining amount of hydrogen A, which is the average of the remaining amount of hydrogen of the first fuel cell system 100a, from the remaining amount of hydrogen B, which is the average of the remaining amount of hydrogen of the second fuel cell system 100b, is not equal to or greater than the predetermined value (S33: NO), the connection destination of the power steering 17b is not switched (S35).

Figure 12A:
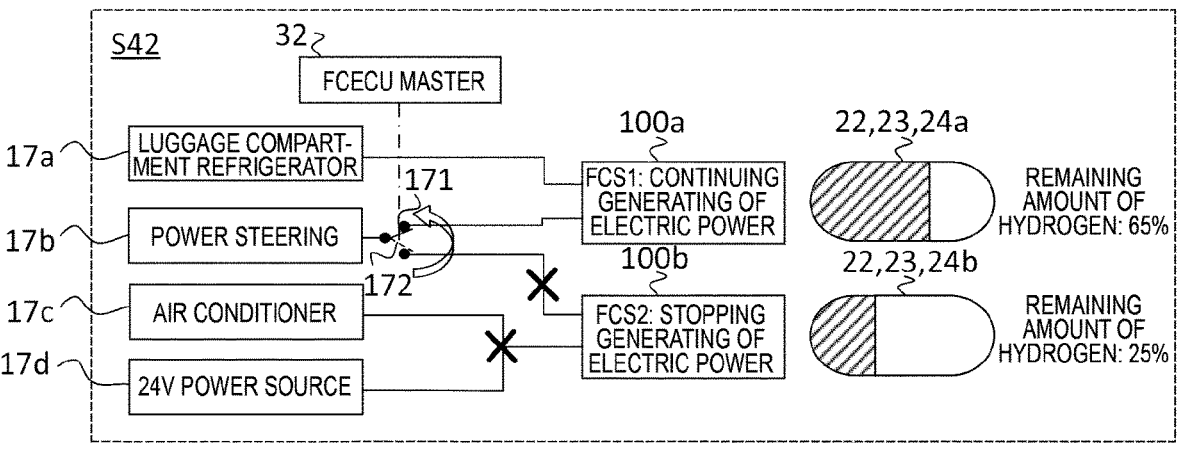
FIG. 12A is an image diagram of a connection state of the high voltage auxiliary machine 17 in the fifth example.
Figure 12B:
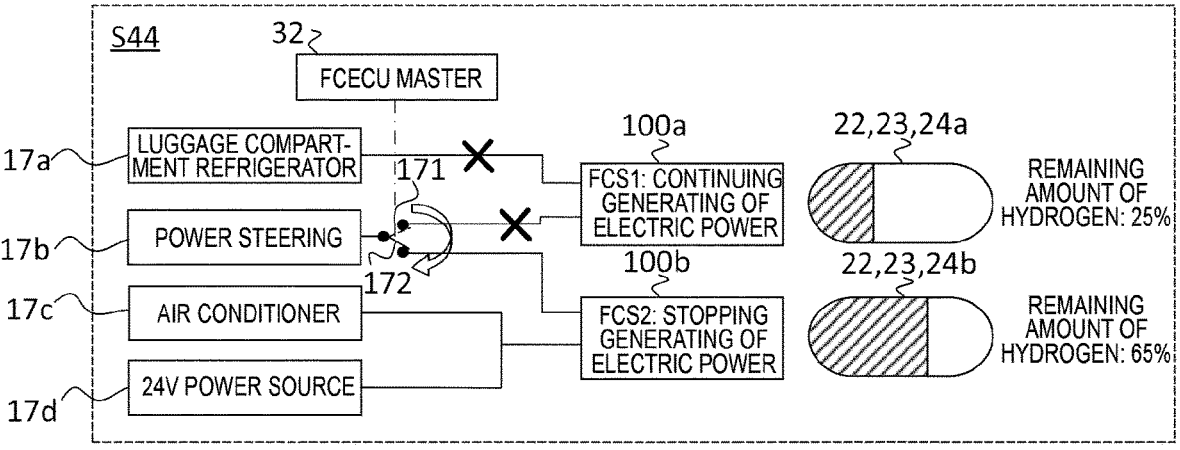
FIG. 12B is an image diagram of a connection state of the high voltage auxiliary machine 17 in the fifth example.

FIG. 11 is a diagram illustrating a fifth example of switching the connection of the high voltage auxiliary machine 17 in the first embodiment. FIG. 11 illustrates a flowchart of switching the connection of the high voltage auxiliary machine 17 in the fifth example. FIG. 12A and FIG. 12B are image diagrams of the connection state of the high voltage auxiliary machine 17 in the fifth example. The image diagram illustrated in FIG. 12A illustrates an image diagram of the connection state at the stage of S42 in the flowchart, and the image diagram illustrated in FIG. 12B illustrates an image diagram of the connection state at the stage of S44 in the flowchart.

As illustrated in the image diagram of the connection state of the high voltage auxiliary machine 17 in FIG. 12A and FIG. 12B, in the fifth example, the luggage compartment refrigerator 17a, which is the high voltage auxiliary machine 17, is connected to the first fuel cell system 100a, the air conditioner 17c and the 24V power source 17d are connected to the second fuel cell system 100b, and the power steering 17b is connected to be electrically switchable to either the first fuel cell system 100a or the second fuel cell system 100b.

In the flowchart of FIG. 11, in a case where the value obtained by subtracting the remaining amount of hydrogen B, which is the average of the remaining amount of hydrogen of the second fuel cell system 100b, from the remaining amount of hydrogen A, which is the average of the remaining amount of hydrogen of the first fuel cell system 100a, is equal to or greater than a predetermined value (S41: YES), the connection destination of the power steering 17b is switched to the first fuel cell system 100a to stop generating electric power of the second fuel cell system 100b (S42). Note that the generating of electric power of the first fuel cell system 100a will continue. In the example illustrated in the image diagram of FIG. 12A, the remaining amount of hydrogen A is 65%, the remaining amount of hydrogen B is 25%, and the remaining amount of hydrogen A–the remaining amount of hydrogen B=40%.

In a case where the value obtained by subtracting the remaining amount of hydrogen B, which is the average of the remaining amount of hydrogen of the second fuel cell system 100b, from the remaining amount of hydrogen A, which is the average of the remaining amount of hydrogen of the first fuel cell system 100a is not equal to or greater than the predetermined value (S41: NO), and where the value obtained by subtracting the remaining amount of hydrogen A, which is the average of the remaining amount of hydrogen of the first fuel cell system 100a, from the remaining amount of hydrogen B, which is the average of the remaining amount of hydrogen of the second fuel cell system 100b, is equal to or greater than a predetermined value (S43: YES), the connection destination of the power steering 17b is switched to the second fuel cell system 100b to stop generating electric power of the first fuel cell system 100a (S44). In the example illustrated in the image diagram of FIG. 12B, the remaining amount of hydrogen B is 65%, the remaining amount of hydrogen A is 25%, and the remaining amount of hydrogen B–the remaining amount of hydrogen A=40%. Note that the generating of electric power of the second fuel cell system 100b will continue.

In a case where the value obtained by subtracting the remaining amount of hydrogen A, which is the average of the remaining amount of hydrogen of the first fuel cell system 100a, from the remaining amount of hydrogen B, which is the average of the remaining amount of hydrogen of the second fuel cell system 100b, is not equal to or greater than the predetermined value (S43: NO), neither the first fuel cell system 100a nor the second fuel cell system 100b will stop generating electric power (S45).

As described above, according to the vehicle 100 in the first embodiment, the connection destination of the high voltage auxiliary machine 17 is switched in consideration of the remaining amount of hydrogen A of the first fuel cell system 100a and the remaining amount of hydrogen B of the second fuel cell system 100b. As a result, the remaining amounts of hydrogen of the first fuel cell system 100a and the second fuel cell system 100b can be adjusted to be equal, and the cruising distance of the vehicle 100 can be increased.

In the first embodiment, the power consumption of the high voltage auxiliary machine 15a of the first fuel cell system 100a or the high voltage auxiliary machine 15b of the second fuel cell system 100b may be adjusted in parallel with switching the connection of the high voltage auxiliary machine 17. For example, in S02 of the first example illustrated in FIG. 3, the power consumption of the high voltage auxiliary machine 15a of the first fuel cell system 100a having a large remaining amount of hydrogen A may be increased (for example, by adjusting the rotation speed of the air pump), and the power consumption of the high voltage auxiliary machine 15b of the second fuel cell system 100b having a large remaining amount of hydrogen B may be reduced.

In the first embodiment, the switching may be performed in consideration of the rated power consumption of the high voltage auxiliary machine 17. For example, in a case where the high voltage auxiliary machine 17 having less power consumption is connected to the fuel cell system having a large remaining amount of hydrogen, and the high voltage auxiliary machine 17 having much power consumption is connected to the fuel cell system having a small remaining amount of hydrogen, the connection of the high voltage auxiliary machine 17 may be switched such that the high voltage auxiliary machine 17 having less power consumption is connected to the fuel cell system having a small remaining amount of hydrogen and the high voltage auxiliary machine 17 having much power consumption is connected to the fuel cell system having a large remaining amount of hydrogen.

In the first embodiment, in a case where the difference between the remaining amount of hydrogen A of the first fuel cell system 100a and the remaining amount of hydrogen B of the second fuel cell system 100b is less than a predetermined value after the connection of the high voltage auxiliary machine 17 is switched, the connection destination of the high voltage auxiliary machine 17 may be switched to the fuel cell system at the original connection destination.

In the first embodiment, the fuel cell system to which the high voltage auxiliary machine 17 is connected may be switched on the basis of the required output of the high voltage auxiliary machine 17. In addition, the operation of the high voltage auxiliary machine 17 may be stopped before the connection destination of the high voltage auxiliary machine 17 is switched, and the operation of the high voltage auxiliary machine 17 may be restarted after the connection destination of the high voltage auxiliary machine 17 is switched.

Figure 13:
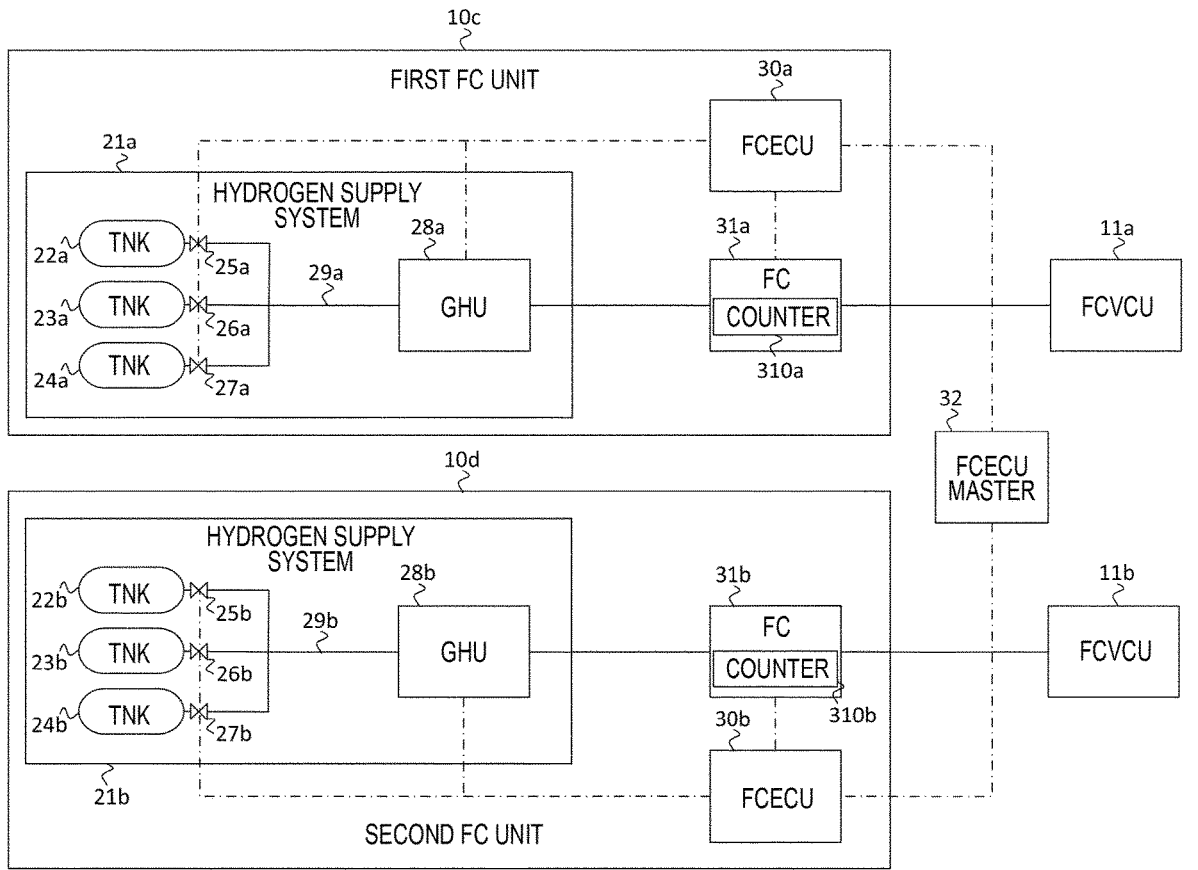
FIG. 13 is a diagram illustrating a schematic configuration of a first FC unit 10c and a second FC unit 10d in a second embodiment.

FIG. 13 is a diagram illustrating a schematic configuration of the first FC unit 10c and the second FC unit 10d in a second embodiment. As illustrated in FIG. 13, the first FC unit 10c includes the hydrogen supply system 21a, the unit 10c, the FCECU 30a, and the FC 31a. The second FC unit 10d includes the hydrogen supply system 21b, the FCECU 30b, and the FC 31b. Hereinafter, configurations different from that of the first embodiment will be described with respect to the second embodiment, and the same configurations as those of the first embodiment will be designated by the same reference numerals and the description thereof will be omitted.

In the second embodiment, the FC 31a is provided with a counter 310a that counts the number of times the fuel cell stack has been used in order to measure the degree of deterioration of the fuel cell stack of the FC 31a. The degree of deterioration A of the FC 31a is calculated from the number of times of use acquired by the counter 310a, and the degree of deterioration A is transmitted to the FCECU 30a. Similarly, the FC 31b is provided with a counter 310b for measuring the degree of deterioration of the fuel cell stack of the FC 31b. The degree of deterioration B of the FC 31b is acquired from the counter 310b, and the degree of deterioration B is transmitted to the FCECU 30b. The FCECU master 32 acquires the degree of deterioration A and the degree of deterioration B from the FCECU 30a and the FCECU 30b, and calculates the difference between the degree of deterioration A of the FC 31a and the degree of deterioration B of the FC 31b. The FCECU master 32 as a control device switches the connection destination of the high voltage auxiliary machine 17 on the basis of the states of the first fuel cell system 100a and the second fuel cell system 100b. In the second embodiment, the states of the first fuel cell system 100a and the second fuel cell system 100b include the difference between the degree of deterioration A of the first fuel cell system 100a and the degree of deterioration B of the second fuel cell system 100b.

Figure 14:
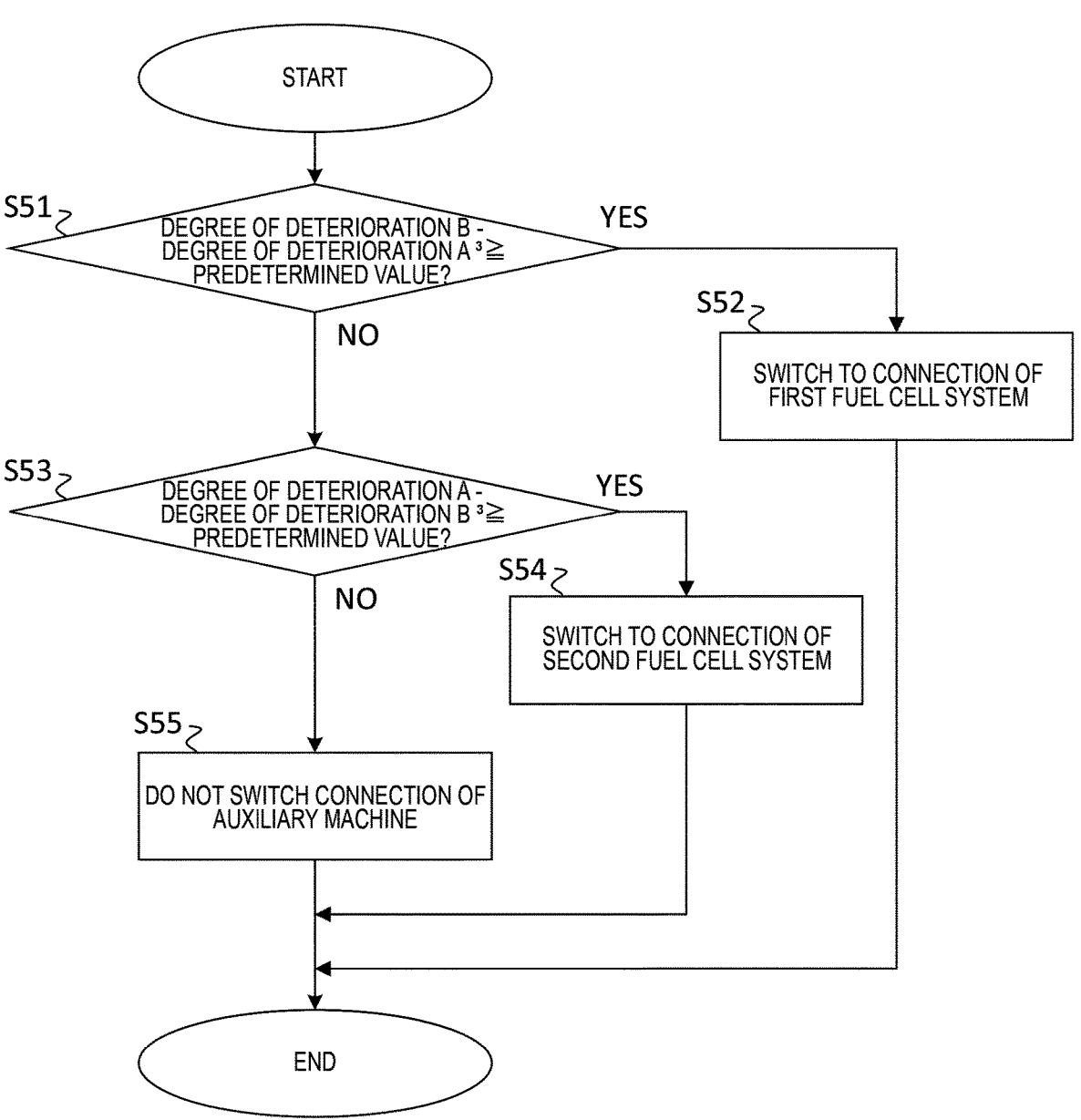
FIG. 14 is a flowchart illustrating a first example of switching the connection of the high voltage auxiliary machine 17 in the second embodiment.
Figure 15A:
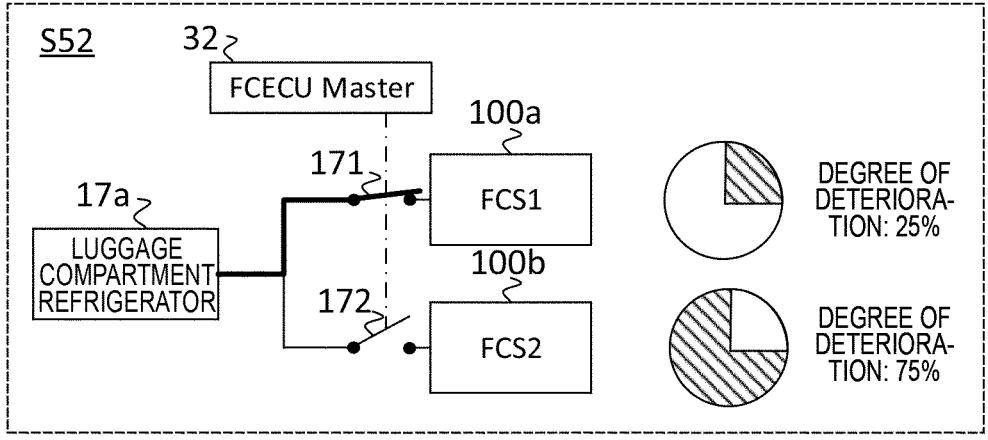
FIG. 15A is an image diagram of a connection state of the high voltage auxiliary machine 17 in the first example.
Figure 15B:
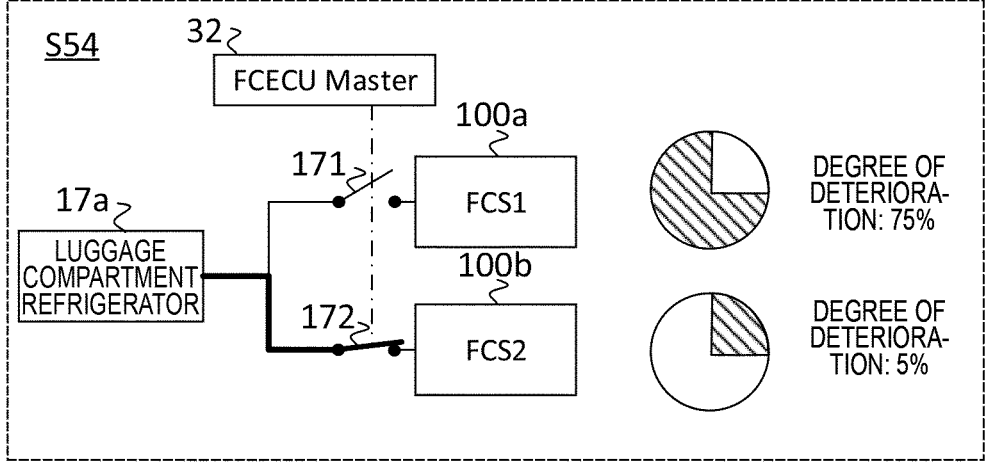
FIG. 15B is an image diagram of a connection state of the high voltage auxiliary machine 17 in the first example.

FIG. 14 is a diagram illustrating a first example of switching the connection of the high voltage auxiliary machine 17 in the second embodiment. FIG. 14 illustrates a flowchart of switching the connection of the high voltage auxiliary machine 17 in the first example. FIG. 15A and FIG. 15B are image diagrams of the connection state of the high voltage auxiliary machine 17 in the second embodiment. The image diagram illustrated in FIG. 15A illustrates an image diagram of the connection state at the stage of S52 in the flowchart, and the image diagram illustrated in FIG. 15B illustrates an image diagram of the connection state at the stage of S54 in the flowchart.

As illustrated in the image diagrams of the connection state of the high voltage auxiliary machine 17 of FIG. 15A and FIG. 15B, in the first example, the luggage compartment refrigerator 17a, which is the high voltage auxiliary machine 17, can be connected to either the first fuel cell system 100a and the second fuel cell system 100b. In the image diagrams illustrated in FIGS. 15A and 15B, the degrees of deterioration of the FC 31a of the first fuel cell system 100a and the FC 31b of the second fuel cell system 100b are illustrated. In the present embodiment, a large numerical value of the degree of deterioration indicates that the deterioration is further advanced.

In the flowchart of FIG. 14, in a case where the value obtained by subtracting the degree of deterioration A of the FC 31a from the degree of deterioration B of the FC 31b is equal to or greater than a predetermined value (S51: YES), the connection destination of the luggage compartment refrigerator 17a is switched to the connection of the first fuel cell system 100a (S52).

In a case where the value obtained by subtracting the degree of deterioration A of the FC 31a from the degree of deterioration B of the FC 31b is not equal to or greater than the predetermined value (S51: NO), and where the value obtained by subtracting the degree of deterioration B of the FC 31b from the degree of deterioration A of the FC 31a is equal to or greater than a predetermined value (S53: YES), the connection destination of the luggage compartment refrigerator 17a is switched to the connection of the second fuel cell system 100b (S54).

In a case where the value obtained by subtracting the degree of deterioration B of the FC 31b from the degree of deterioration A of the FC 31a is not equal to or greater than the predetermined value (S53: NO), the connection destination of the luggage compartment refrigerator 17a is not switched (S55).

Figure 16:
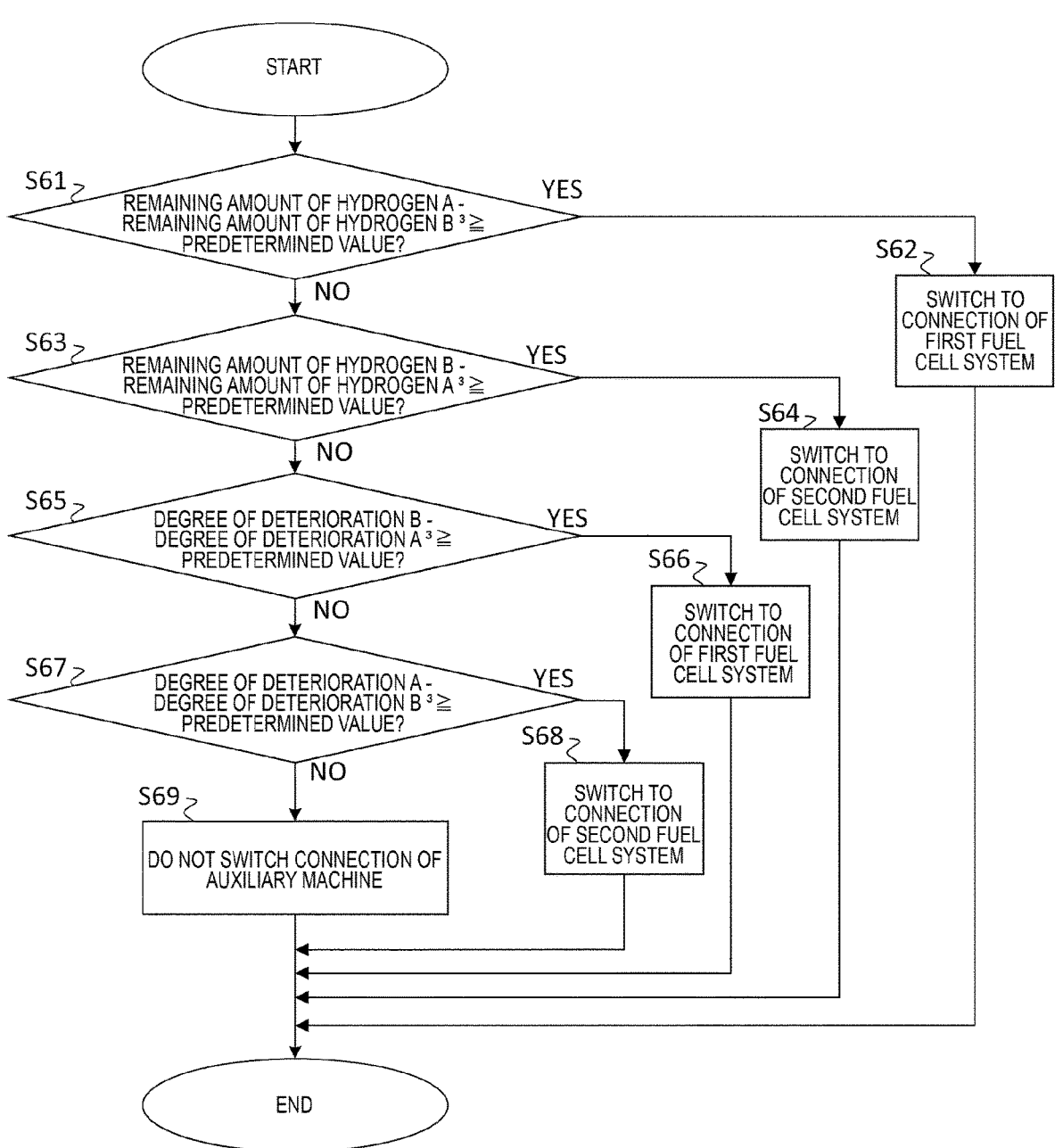
FIG. 16 is a flowchart illustrating a second example of switching the connection of the high voltage auxiliary machine 17 in the second embodiment.
Figure 17A:
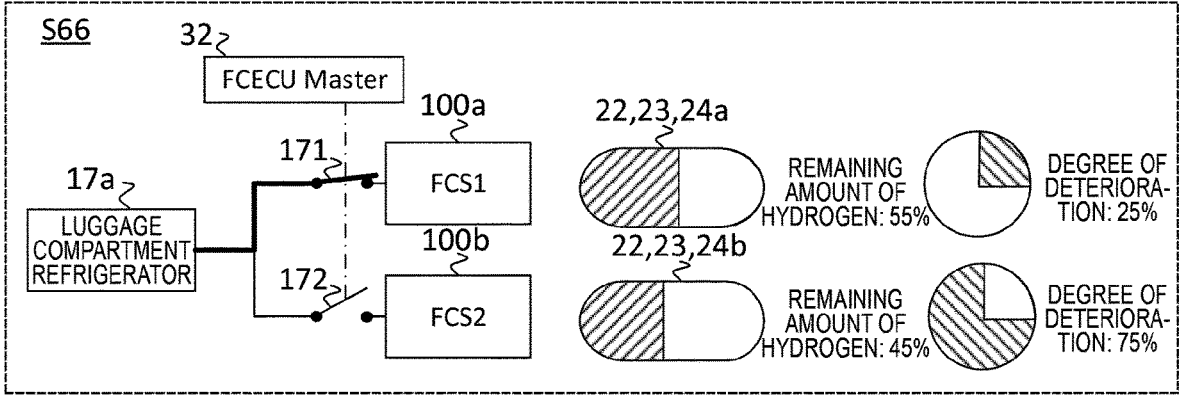
FIG. 17A is an image diagram of a connection state of the high voltage auxiliary machine 17 in the second example.
Figure 17B:
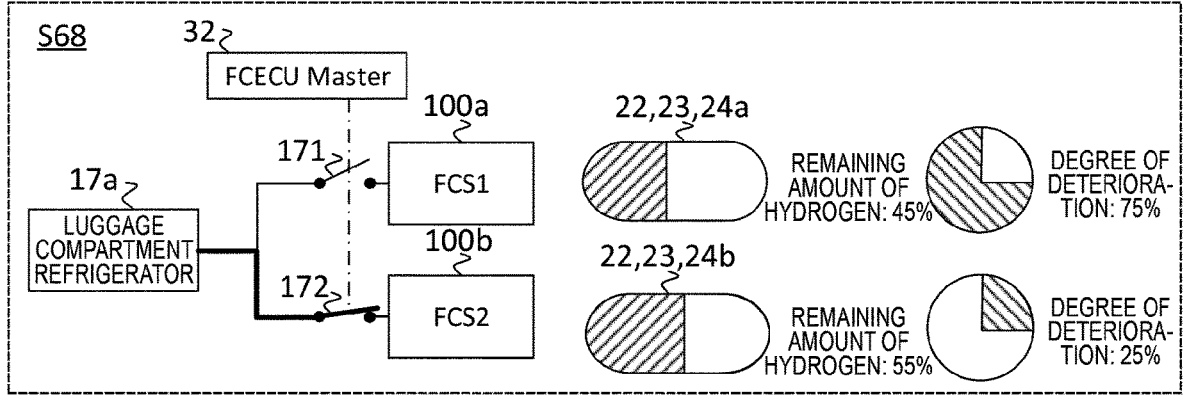
FIG. 17B is an image diagram of a connection state of the high voltage auxiliary machine 17 in the second example.

FIG. 16 is a diagram illustrating a second example of switching the connection of the high voltage auxiliary machine 17 in the second embodiment. FIG. 16 illustrates a flowchart of switching the connection of the high voltage auxiliary machine 17 in the second example. FIG. 17A and FIG. 17B are image diagrams of the connection state of the high voltage auxiliary machine 17 in the second embodiment. FIG. 17A illustrates an image diagram of the connection state at the stage of S64 in the flowchart of FIG. 16, and FIG. 17B illustrates an image diagram of the connection state at the stage of S68 in the flowchart of FIG. 16.

As illustrated in the image diagrams of the connection state of the high voltage auxiliary machine 17 of FIG. 17A and FIG. 17B, in the second example, the luggage compartment refrigerator 17a, which is the high voltage auxiliary machine 17, can be connected to either the first fuel cell system 100a and the second fuel cell system 100b. In the image diagrams illustrated in FIG. 17A and FIG. 17B, the remaining amount of hydrogen of the hydrogen tank of the first fuel cell system 100a and the remaining amount of hydrogen of the hydrogen tank of the second fuel cell system 100b are illustrated. In addition, the degrees of deterioration of the FC 31a of the first fuel cell system 100a and the FC 31b of the second fuel cell system 100b are illustrated. In the present embodiment, a large numerical value of the degree of deterioration indicates that the deterioration is further advanced.

In the flowchart of FIG. 16, in a case where the value obtained by subtracting the remaining amount of hydrogen B, which is the average of the remaining amount of hydrogen of the second fuel cell system 100b, from the remaining amount of hydrogen A, which is the average of the remaining amount of hydrogen of the first fuel cell system 100a, is equal to or greater than a predetermined value (S61: YES), the connection destination of the luggage compartment refrigerator 17a is switched to the connection of the first fuel cell system 100a (S62). In a case where the value obtained by subtracting the remaining amount of hydrogen B, which is the average of the remaining amount of hydrogen of the second fuel cell system 100b, from the remaining amount of hydrogen A, which is the average of the remaining amount of hydrogen of the first fuel cell system 100a is not equal to or greater than the predetermined value (S61: NO), and where the value obtained by subtracting the remaining amount of hydrogen A, which is the average of the remaining amount of hydrogen of the first fuel cell system 100a, from the remaining amount of hydrogen B, which is the average of the remaining amount of hydrogen of the second fuel cell system 100b, is equal to or greater than a predetermined value (S63: YES), the connection destination of the luggage compartment refrigerator 17a is switched to the connection of the second fuel cell system 100b (S64).

In a case where both S61 and S63 are NO, and the value obtained by subtracting the degree of deterioration A of the FC 31a from the degree of deterioration B of the FC 31b is equal to or greater than a predetermined value (S65: YES), the connection destination of the luggage compartment refrigerator 17a is switched to the connection of the first fuel cell system 100a in consideration of the degree of deterioration of the fuel cell stack with priority (S66).

In a case where the value obtained by subtracting the degree of deterioration B of the FC 31b from the degree of deterioration A of the FC 31a is equal to or greater than a predetermined value (S67: YES), the connection destination of the luggage compartment refrigerator 17a is switched to the connection of the second fuel cell system 100b in consideration of the degree of deterioration of the fuel cell stack with priority (S68).

In a case where the value obtained by subtracting the degree of deterioration A of the FC 31a from the degree of deterioration B of the FC 31b is not equal to or greater than the predetermined value (S65: NO), and where the value obtained by subtracting the degree of deterioration B of the FC 31b from the degree of deterioration A of the FC 31a is not equal to or greater than the predetermined value (S67: NO), the connection destination of the luggage compartment refrigerator 17a is not switched (S69).

As described above, according to the vehicle 100 in the second embodiment, the connection destination of the high voltage auxiliary machine 17 is switched in consideration of the degree of deterioration B of the FC 31a of the first fuel cell system 100a and the degree of deterioration B of the FC 31b of the second fuel cell system 100b. As a result, the degrees of deterioration of the fuel cell stacks of the first fuel cell system 100a and the second fuel cell system 100b can be adjusted to be equal, and the cruising distance of the vehicle 100 can be increased.

In addition, according to the vehicle 100 in the second embodiment, the connection destination of the high voltage auxiliary machine 17 is switched in consideration of the remaining amount of hydrogen A of the first fuel cell system 100a and the remaining amount of hydrogen B of the second fuel cell system 100b, and the degree of deterioration A of the FC 31a of the first fuel cell system 100a and the degree of deterioration B of the FC 31b of the second fuel cell system 100b. As a result, the remaining amounts of hydrogen of the first fuel cell system 100a and the second fuel cell system 100b can be adjusted to be equal. At the same time, the degrees of deterioration of the fuel cell stacks can be adjusted to be equal, and the cruising distance of the vehicle 100 can be increased.

In the second embodiment, in a case where the difference between the degree of deterioration A of the FC 31a of the first fuel cell system 100a and the degree of deterioration B of the FC 31b of the second fuel cell system 100b is less than the predetermined value, the connection destination of the high voltage auxiliary machine 17 which has switched the fuel cell system at the connection destination may be switched to the fuel cell system of the original connection destination. In addition, the FCECU may monitor the operating time of the fuel cell stack, and the magnitude of the degree of deterioration may be determined depending on the length of the operating time so as to adjust the degree of deterioration.

Figure 18:
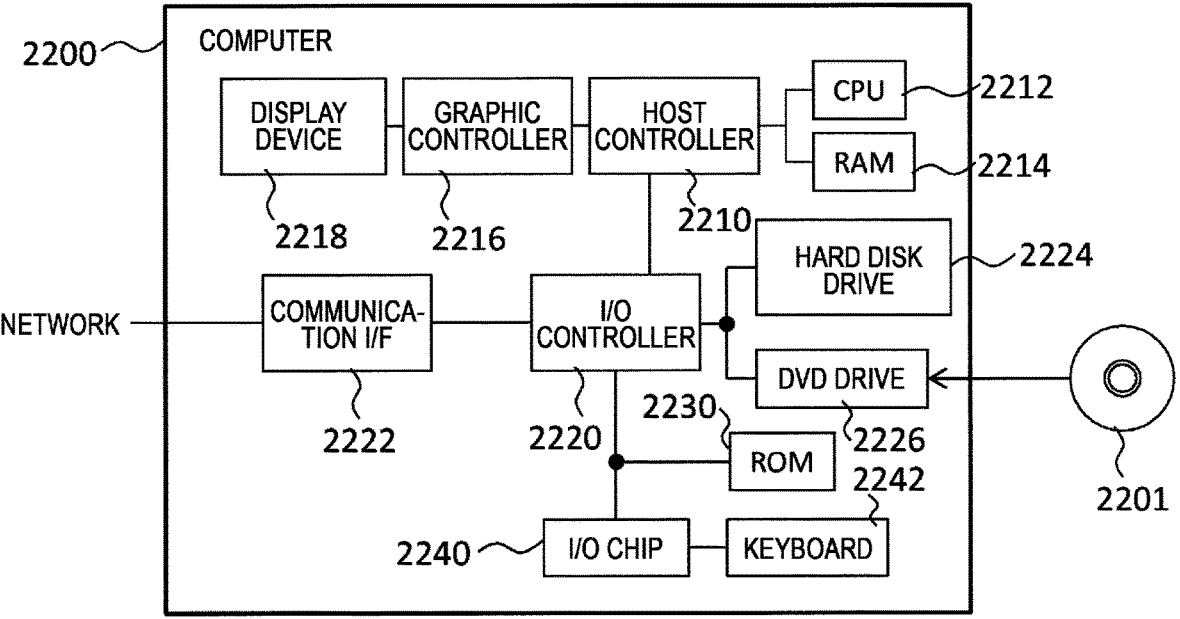
FIG. 18 illustrates an example of a computer 2200.

FIG. 18 illustrates an example of a computer 2200 in which a plurality of aspects of the present invention may be embodied in whole or in part. A program installed in the computer 2200 may cause the computer 2200 to function as an operation associated with the devices according to the embodiments of the present invention or as one or more sections of the devices, or may cause the operation or the one or more sections to be executed, and/or may cause the computer 2200 to execute a process according to the embodiments of the present invention or a stage of the process. Such programs may be executed by a CPU 2212 to cause the computer 2200 to perform certain operations associated with some or all of the blocks in the flowcharts and block diagrams described in the present specification.

The computer 2200 according to the present embodiment includes the CPU 2212, a RAM 2214, a graphic controller 2216, and a display device 2218, which are interconnected by a host controller 2210. The computer 2200 also includes input/output units such as a communication interface 2222, a hard disk drive 2224, a DVD-ROM drive 2226, and an IC card drive, which are connected to the host controller 2210 via an input/output controller 2220. The computer also includes legacy input/output units such as a ROM 2230 and a keyboard 2242, which are connected to the input/output controller 2220 via an input/output chip 2240.

The CPU 2212 operates according to a program stored in the ROM 2230 and the RAM 2214, thereby controlling each unit. The graphics controller 2216 acquires image data generated by the CPU 2212 in a frame buffer or the like provided in the RAM 2214 or in itself, such that the image data is displayed on the display device 2218.

The communication interface 2222 communicates with other electronic devices via a network. The hard disk drive 2224 stores programs and data used by the CPU 2212 in the computer 2200. The DVD-ROM drive 2226 reads the program or data from the DVD-ROM 2201, and provides the program or data to the hard disk drive 2224 via the RAM 2214. The IC card drive reads programs and data from the IC card, and/or writes programs and data to the IC card.

The ROM 2230 stores therein boot programs and the like executed by the computer 2200 at the time of activation, and/or programs that depend on the hardware of the computer 2200. The input/output chip 2240 may also connect various input/output units to the input/output controller 2220 via parallel ports, serial ports, keyboard ports, mouse ports, or the like.

The program is provided by a computer readable medium such as the DVD-ROM 2201 or the IC card. The program is read from the computer readable medium, installed in the hard disk drive 2224, the RAM 2214, or the ROM 2230 which are also examples of the computer readable medium, and executed by the CPU 2212. The information processing described in these programs is read by the computer 2200 and provides cooperation between the programs and various types of hardware resources. The device or method may be configured by implementing operations or processing of information according to use of the computer 2200.

For example, in a case where communication is performed between the computer 2200 and an external device, the CPU 2212 may execute a communication program loaded in the RAM 2214 and instruct the communication interface 2222 to perform communication processing on the basis of a process described in the communication program. Under the control of the CPU 2212, the communication interface 2222 reads transmission data stored in a transmission buffer processing area provided in a recording medium such as the RAM 2214, the hard disk drive 2224, the DVD-ROM 2201, or the IC card, transmits the read transmission data to the network, or writes reception data received from the network in a reception buffer processing area or the like provided on the recording medium.

In addition, the CPU 2212 may cause the RAM 2214 to read all ora necessary part of a file or database stored in an external recording medium such as the hard disk drive 2224, the DVD-ROM drive 2226 (DVD-ROM 2201), the IC card, or the like, and may execute various types of processing on data on the RAM 2214. Next, the CPU 2212 writes back the processed data to the external recording medium.

Various types of information such as various types of programs, data, tables, and databases may be stored in a recording medium and subjected to information processing. The CPU 2212 may execute various types of processing on the data read from the RAM 2214, including various types of operations, information processing, conditional determination, conditional branching, unconditional branching, information retrieval/replacement, and the like, which are described throughout the present disclosure and specified by a command sequence of a program, and writes back the results to the RAM 2214. In addition, the CPU 2212 may retrieve information in a file, a database, or the like in the recording medium. For example, in a case where a plurality of entries each having the attribute value of a first attribute associated with the attribute value of a second attribute is stored in the recording medium, the CPU 2212 may retrieve the plurality of entries for an entry matching the condition in which the attribute value of the first attribute is specified, read the attribute value of the second attribute stored in the entry, and thereby acquire the attribute value of the second attribute associated with the first attribute satisfying the predetermined condition.

The programs or software modules described above may be stored in a computer readable medium on or near the computer 2200. In addition, a recording medium such as a hard disk or a RAM provided in a server system connected to a dedicated communication network or the Internet can be used as a computer readable medium, thereby providing a program to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10*a*: first FC unit
10*b*: second FC unit
11*a*: FCVCU
11*b*: FCVCU
12*a*: BATTVCU 12*b*: BATTVCU
13*a*: PDU
13*b*: PDU
14*a*: MOT
14*b*: MOT
15*a*: high voltage auxiliary machine
15*b*: high voltage auxiliary machine
16*a*: IPU
16*b*: IPU
17: high voltage auxiliary machine
22*a*, 23*a*, 24*a*: hydrogen tank
22*a*, 23*a*, 24*b*: hydrogen tank
25*a*, 26*a*, 27*a*: valve
25*a*, 26*a*, 27*b*: valve
28*a*: pressure reduction valve unit
28*b*: pressure reduction valve unit
29*a*: pipe
29*b*: pipe
32: FCECU master
100*a*: first fuel cell system
100*b*: second fuel cell system
100: vehicle

What is claimed is:

1. A fuel cell power system comprising:
a plurality of fuel cell systems including a fuel cell stack and a fuel tank for storing fuel gas and supplying the fuel gas to the fuel cell stack;
an auxiliary machine configured to be connected to be electrically switchable to any of the plurality of fuel cell systems, and consume electric power output from the plurality of fuel cell systems; and
a control device configured to switch the fuel cell system to which the auxiliary machine is connected, on a basis of a state of the plurality of the fuel cell systems, wherein
the state of the plurality of fuel cell systems include a difference in a remaining amount of the fuel gas in the fuel tank, among the plurality of fuel cell systems.

2. The fuel cell power system according to claim 1, wherein
in a case where a difference in a remaining amount of the fuel gas in the fuel tank, among the plurality of fuel cell systems, is equal to or greater than a predetermined value, and the auxiliary machine is connected to the fuel cell system having a small remaining amount of the fuel gas in the fuel tank, the control device is configured to switch a connection of the auxiliary machine to the fuel cell system having a large remaining amount of the fuel gas in the fuel tank.

3. The fuel cell power system according to claim 2, wherein
in a case where the difference in the remaining amount of the fuel gas in the fuel tank, among the plurality of fuel cell systems, after the connection of the auxiliary machine is switched, is less than the predetermined value, the control device is configured to switch a connection destination of the auxiliary machine to the fuel cell system at an original connection destination.

4. The fuel cell power system according to claim 2, wherein
the control device is configured to switch a connection destination of the auxiliary machine connected to a fuel cell system of which a remaining amount of the fuel gas in the fuel tank is less than a predetermined value to a fuel cell system of which a remaining amount of the fuel gas in the fuel tank is equal to or greater than the predetermined value, and the control device is configured to stop electric power generation by the fuel cell system of which the remaining amount of the fuel gas in the fuel tank is less than the predetermined value.

5. The fuel cell power system according to claim 1, wherein
the control device is configured to switch a connection destination of the auxiliary machine connected to a fuel cell system of which a remaining amount of the fuel gas in the fuel tank is less than a predetermined value to a fuel cell system of which a remaining amount of the fuel gas in the fuel tank is equal to or greater than the predetermined value, and
the control device is configured to stop electric power generation by the fuel cell system of which the remaining amount of the fuel gas in the fuel tank is less than the predetermined value.

6. The fuel cell power system according to claim 1, wherein
the state of the plurality of fuel cell systems includes a difference in a degree of deterioration of the fuel cell stack, among the fuel cell systems.

7. The fuel cell power system according to claim 6, wherein
in a case where the difference in the degree of deterioration of the fuel cell stack, among the plurality of fuel cell systems, is equal to or greater than a predetermined value, the control device is configured to switch a connection destination of the auxiliary machine connected to the fuel cell system having a high degree of deterioration of the fuel cell stack to the fuel cell system having a low degree of deterioration of the fuel cell stack.

8. The fuel cell power system according to claim 7, wherein
in a case where the difference in the degree of deterioration of the fuel cell stack, among the plurality of fuel cell systems, is less than the predetermined value, the control device is configured to switch the connection destination of the auxiliary machine for which the fuel cell system at the connection destination has been switched to the fuel cell system at an original connection destination.

9. The fuel cell power system according to claim 6, wherein
in a case where a difference in a remaining amount of the fuel gas in the fuel tank, among the plurality of fuel cell systems, is less than a predetermined value, and the difference in the degree of deterioration of the fuel cell stack, among the plurality of fuel cell systems, is equal to or greater than the predetermined value, the control device is configured to switch a connection destination of the auxiliary machine to the fuel cell system having a low degree of deterioration of the fuel cell stack.

10. The fuel cell power system according to claim 1, wherein
the control device is configured to stop an operation of the auxiliary machine before a connection destination of the auxiliary machine is switched, and to restart the operation of the auxiliary machine after the connection destination of the auxiliary machine is switched.

11. The fuel cell power system according to claim 1, wherein
the control device is configured to adjust power consumption of the auxiliary machine on a basis of a remaining amount of the fuel gas in the fuel tank of the fuel cell system.

12. The fuel cell power system according to claim 1, wherein the auxiliary machine is an electric machine that is installed in a vehicle including the fuel cell power system.

13. The fuel cell power system according to claim 12, wherein the electric machine includes an electric machine that is not used for running, stopping, or steering the vehicle.

14. The fuel cell power system according to claim 12, wherein the electric machine includes an electric machine that is not currently in operation.

15. The fuel cell power system according to claim 12, wherein a power source of the electric machine is turned on or off by a user.

16. The fuel cell power system according to claim 1, wherein the control device holds in advance a table in which information related to the auxiliary machine is stored, including power consumption of the auxiliary machine.

17. A fuel cell power system comprising:

a plurality of fuel cell systems including a fuel cell stack and a fuel tank for storing fuel gas and supplying the fuel gas to the fuel cell stack;

an auxiliary machine configured to be connected to be electrically switchable to any of the plurality of fuel cell systems, and consume electric power output from the plurality of fuel cell systems; and a control device configured to switch the fuel cell system to which the auxiliary machine is connected, on a basis of a state of the plurality of the fuel cell systems, wherein the control device is configured to switch the plurality of fuel cell systems to which the auxiliary machine is connected, on a basis of a required output of the auxiliary machine.

18. A fuel cell power system comprising:

a plurality of fuel cell systems including a fuel cell stack and a fuel tank for storing fuel gas and supplying the fuel gas to the fuel cell stack;

an auxiliary machine configured to be connected to be electrically switchable to any of the plurality of fuel cell systems, and consume electric power output from the plurality of fuel cell systems; and a control device configured to switch the fuel cell system to which the auxiliary machine is connected, on a basis of a state of the plurality of the fuel cell systems, wherein the auxiliary machine includes a first auxiliary machine having less power consumption and a second auxiliary machine having more power consumption than the first auxiliary machine, and in a case where a difference in a remaining amount of the fuel gas in the fuel tank, among the plurality of fuel cell systems, is equal to or greater than a predetermined value, the first auxiliary machine is connected to the fuel cell system having a large remaining amount of the fuel gas in the fuel tank, and the second auxiliary machine is connected to the fuel cell system having a small remaining amount of the fuel gas in the fuel tank, the control device is configured to switch a connection of the auxiliary machine such that the first auxiliary machine is connected to the fuel cell system having the small remaining amount of the fuel gas in the fuel tank and the second auxiliary machine is connected to the fuel cell system having the large remaining amount of the fuel gas in the fuel tank.

* * * * *